US011314776B2

(12) United States Patent
Gorkin et al.

(10) Patent No.: US 11,314,776 B2
(45) Date of Patent: Apr. 26, 2022

(54) LOCATION SHARING USING FRIEND LIST VERSIONS

(71) Applicant: Snap Inc., Santa Monica, CA (US)

(72) Inventors: Leonid Gorkin, Chappaqua, NY (US);
Mengyao Li, Ho-Ho-Kus, NJ (US);
Arif Oğuz Yildiz, New York, NY (US);
Jeremie Gabor, Pointe-Claire (CA);
Robert Marianski, Astoria, NY (US);
Xiaohan Zhao, West Windsor, NJ (US);
Benjamin Feder, Brooklyn, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/946,288

(22) Filed: Jun. 15, 2020

(65) Prior Publication Data

US 2021/0390118 A1    Dec. 16, 2021

(51) Int. Cl.
*G06F 16/27* (2019.01)
*H04L 29/08* (2006.01)
(Continued)

(52) U.S. Cl.
CPC ............ *G06F 16/273* (2019.01); *G06F 9/548* (2013.01); *G06F 16/2379* (2019.01);
(Continued)

(58) Field of Classification Search
CPC .... G06F 16/273; G06F 16/2379; G06F 9/548; H04L 65/608; H04L 67/1097; H04L 67/18
(Continued)

(56) References Cited

U.S. PATENT DOCUMENTS 666,223 A    1/1901    Shedlock
4,581,634 A    4/1986    Williams
(Continued)

FOREIGN PATENT DOCUMENTS

CA    2887596 A1    7/2015
EP    2051480 A1    4/2009
(Continued)

OTHER PUBLICATIONS

Forums.Expo, The rate limit of Location module, Dec. 2017, forums.expo.dev, https://forums.expo.dev/t/the-rate-limit-of-location-module/5976 (Year: 2017).*
(Continued)

*Primary Examiner* — Zi Ye
(74) *Attorney, Agent, or Firm* — Schwegman Lundberg & Woessner, P.A.

(57) ABSTRACT

Aspects of the present disclosure involve a system and a method for performing operations comprising: storing, on a distributed storage system, a plurality of real-time graph (RTG) instances that include a plurality of device objects, the plurality of device objects comprising a first device object associated with a given user; receiving, by the first device object, a friends list of the given user having a first version identifier; receiving, by the first device object, an update from a client device associated with the given user, the update comprising a friends list version identifier; determining that the first version identifier of the friends list in the first device object mismatches the friends list version identifier in the update; and synchronizing the friends list in the first device object prior to sending one or more messages that include the update to other device objects of the plurality of device objects.

20 Claims, 17 Drawing Sheets

(51) Int. Cl.
*H04L 29/06* (2006.01)
*G06F 9/54* (2006.01)
*G06F 16/23* (2019.01)
*H04L 67/1097* (2022.01)
*H04L 65/65* (2022.01)
*H04L 67/52* (2022.01)

(52) U.S. Cl.
CPC ........ *H04L 65/608* (2013.01); *H04L 67/1097* (2013.01); *H04L 67/18* (2013.01); *G06F 2209/544* (2013.01)

(58) Field of Classification Search
USPC ........................................................ 707/613
See application file for complete search history.

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kekkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,510,383 B2 | 8/2013 | Hurley et al. |

(56) References Cited

U.S. PATENT DOCUMENTS

| | | |
|---|---|---|
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,088,625 B1 | 7/2015 | Moczydlowski |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,369,833 B2 | 6/2016 | Tharshanan et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,411,506 B1 | 8/2016 | Prado et al. |
| 9,430,783 B1 | 8/2016 | Sehn |
| 9,432,450 B2 | 8/2016 | Skaaksrud et al. |
| 9,432,810 B2 | 8/2016 | Husain et al. |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,854,219 B2 | 12/2017 | Sehn |
| 10,021,605 B2 | 7/2018 | Dong et al. |
| 10,681,491 B1 | 6/2020 | Chen et al. |
| 10,939,246 B1 | 3/2021 | Dancie et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203897 A1 | 10/2004 | Rogers |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0154713 A1 | 7/2006 | Sunazuka et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2007/0281716 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0036778 A1 | 2/2008 | Sheha et al. |

(56) References Cited

U.S. PATENT DOCUMENTS

| | | |
|---|---|---|
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0021421 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0005018 A1 | 1/2009 | Forstall et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0008971 A1 | 4/2009 | Wood et al. |
| 2009/0089678 A1 | 4/2009 | Sacco et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0222526 A1 | 9/2009 | Cox et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0146128 A1 | 6/2010 | Kulkarni et al. |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0274569 A1 | 10/2010 | Reudink |
| 2010/0281045 A1 | 11/2010 | Dean |
| 2010/0306669 A1 | 12/2010 | Della Pasqua |
| 2010/0318604 A1* | 12/2010 | Stafie ............... H04L 63/08 709/203 |
| 2010/0325194 A1* | 12/2010 | Williamson ............ H04L 67/26 709/203 |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0151837 A1* | 6/2011 | Winbush, III ...... H04L 67/1095 455/412.1 |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |

(56) References Cited

U.S. PATENT DOCUMENTS

| | | |
|---|---|---|
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0001651 A1 | 6/2012 | Lalancette et al. |
| 2012/0143760 A1 | 6/2012 | Abulafia et al. |
| 2012/0150978 A1 | 6/2012 | Monaco |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0024354 A1 | 1/2014 | Haik et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0180983 A1 | 6/2014 | Deng et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0310367 A1 | 10/2014 | Maguire |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0329548 A1 | 11/2014 | Tharshanan et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0222814 A1 | 8/2015 | Li et al. |
| 2015/0261917 A1 | 9/2015 | Smith |

(56) References Cited

U.S. PATENT DOCUMENTS

| | | |
|---|---|---|
| 2015/0289108 A1 | 10/2015 | Sandel et al. |
| 2015/0304368 A1 | 10/2015 | Vaccari et al. |
| 2015/0312184 A1 | 10/2015 | Langholz et al. |
| 2015/0350136 A1 | 12/2015 | Flynn, III et al. |
| 2015/0350140 A1 | 12/2015 | Garcia et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085386 A1 | 3/2016 | Bridge et al. |
| 2016/0085773 A1 | 3/2016 | Chang et al. |
| 2016/0085863 A1 | 3/2016 | Allen et al. |
| 2016/0092532 A1 | 3/2016 | Jia et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0277419 A1 | 9/2016 | Allen et al. |
| 2016/0320199 A1 | 11/2016 | Chen et al. |
| 2016/0321708 A1 | 11/2016 | Sehn |
| 2016/0380955 A1 | 12/2016 | Kremins |
| 2016/0381501 A1 | 12/2016 | Ballezzi et al. |
| 2017/0006094 A1 | 1/2017 | Abou Mahmoud et al. |
| 2017/0026509 A1 | 1/2017 | Rand |
| 2017/0061308 A1 | 3/2017 | Chen et al. |
| 2017/0147699 A1 | 5/2017 | Rubin et al. |
| 2017/0287006 A1 | 10/2017 | Azmoodeh et al. |
| 2018/0239796 A1 | 8/2018 | Song et al. |
| 2019/0325062 A1 | 10/2019 | Rogulenko |
| 2020/0044939 A1 | 2/2020 | Xia |
| 2020/0107165 A1 | 4/2020 | Pai et al. |
| 2020/0133967 A1 | 4/2020 | Shukla et al. |
| 2020/0273136 A1 | 8/2020 | Li et al. |
| 2021/0084138 A1 | 3/2021 | Gal |
| 2021/0113931 A1 | 4/2021 | Benedetto et al. |
| 2021/0117780 A1 | 4/2021 | Malik et al. |
| 2021/0133245 A1 | 5/2021 | Reehil et al. |
| 2021/0232589 A1 | 7/2021 | Nelson et al. |
| 2021/0392098 A1 | 12/2021 | Gorkin et al. |
| 2021/0392459 A1 | 12/2021 | Gorkin et al. |
| 2021/0392460 A1 | 12/2021 | Gorkin et al. |

FOREIGN PATENT DOCUMENTS

| | | |
|---|---|---|
| EP | 2151797 A1 | 2/2010 |
| GB | 2399928 A | 9/2004 |
| KR | 19990073076 A | 10/1999 |
| KR | 20010078417 A | 8/2001 |
| KR | 101658943 B1 | 9/2016 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016065131 A1 | 4/2016 |
| WO | WO-2016054562 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |
| WO | WO-2019028415 A1 | 2/2019 |
| WO | WO-2019108702 A1 | 6/2019 |
| WO | WO-2020117174 A1 | 6/2020 |

OTHER PUBLICATIONS

Hrisko, Real-Time Graphing in Python, Aug. 14, 2018, makersportal.com, https://makersportal.eom/blog/2018/8/14/real-time-graphing-in-python (Year: 2018).*

"A Whole New Story", Snap, Inc., [Online] Retrieved from the Internet: <URL: https://www.snap.com/en-US/news/>, (2017), 13 pgs.

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 16/946,285, Notice of Allowance dated Sep. 17, 2021", 17 pgs.

"U.S. Appl. No. 16/946,286, Non Final Office Action dated Aug. 11, 2021", 12 pgs.

"U.S. Appl. No. 16/946,286, Response filed Nov. 5, 2021 to Non Final Office Action dated Aug. 11, 2021", 9 pgs.

"BlogStomp", StompSoftware, [Online] Retrieved from the Internet: <URL: http://stompsoftware.com/blogstomp>, (accessed May 24, 2017), 12 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

"InstaPlace Photo App Tell The Whole Story", [Online] Retrieved from the Internet: <URL: youtu.be/uF_gFkg1hBM>, (Nov. 8, 2013), 113 pgs., 1:02 min.

"International Application Serial No. PCT/US2015/037251, International Search Report dated Sep. 29, 2015", 2 pgs.

"International Application Serial No. PCT/US2021/037220, International Search Report dated Oct. 1, 2021", 4 pgs.

"International Application Serial No. PCT/US2021/037220, Written Opinion dated Oct. 1, 2021", 4 pgs.

"International Application Serial No. PCT/US2021/037229, International Search Report dated Oct. 5, 2021", 4 pgs.

"International Application Serial No. PCT/US2021/037229, Written Opinion dated Oct. 5, 2021", 3 pgs.

"International Application Serial No. PCT/US2021/037499, International Search Report dated Sep. 17, 2021", 3 pgs.

"International Application Serial No. PCT/US2021/037499, Written Opinion dated Sep. 17, 2021", 3 pgs.

"International Application Serial No. PCT/US2021/037503, International Search Report dated Oct. 6, 2021", 3 pgs.

"International Application Serial No. PCT/US2021/037503, Written Opinion dated Oct. 6, 2021", 4 pgs.

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the Internet: <URL: https://www.youtube.com/watch?v=RWwQXi9RG0w>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

(56) References Cited

OTHER PUBLICATIONS

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

Carthy, Roi, "Dear All Photo Apps: Mobil Just Won Filters", TechCrunch, [Online] Retrieved from the Internet: <URL: https://techcrunch.com/2011/09/08/mobli-filters>, (Sep. 8, 2011), 10 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

MacLeod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

MacLeod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Notopoulos, Katie, "A Guide to the New Snapchat Filters and Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, a Replay Function and for Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.

U.S. Appl. No. 16/946,284, filed Jun. 15, 2020, Scalable Real-Time Location Sharing Framework.

U.S. Appl. No. 16/946,285, filed Jun. 15, 2020, Location Sharing Using Offline And Online Objects.

U.S. Appl. No. 16/946,286, filed Jun. 15, 2020, Location Sharing Using Different Rate-Limited Links.

* cited by examiner

LOCATION SHARING USING FRIEND LIST VERSIONS

TECHNICAL FIELD

The present disclosure generally relates to real-time location sharing.

BACKGROUND

The popularity of users interacting with other users online continues to grow. There are many ways for users to interact online with other users. Users can communicate with their friends using messaging applications and can play with other users online in multiplayer video games or perform other actions using various other applications. Users also increasing desire to see where their friends are currently located.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

Figure 1:
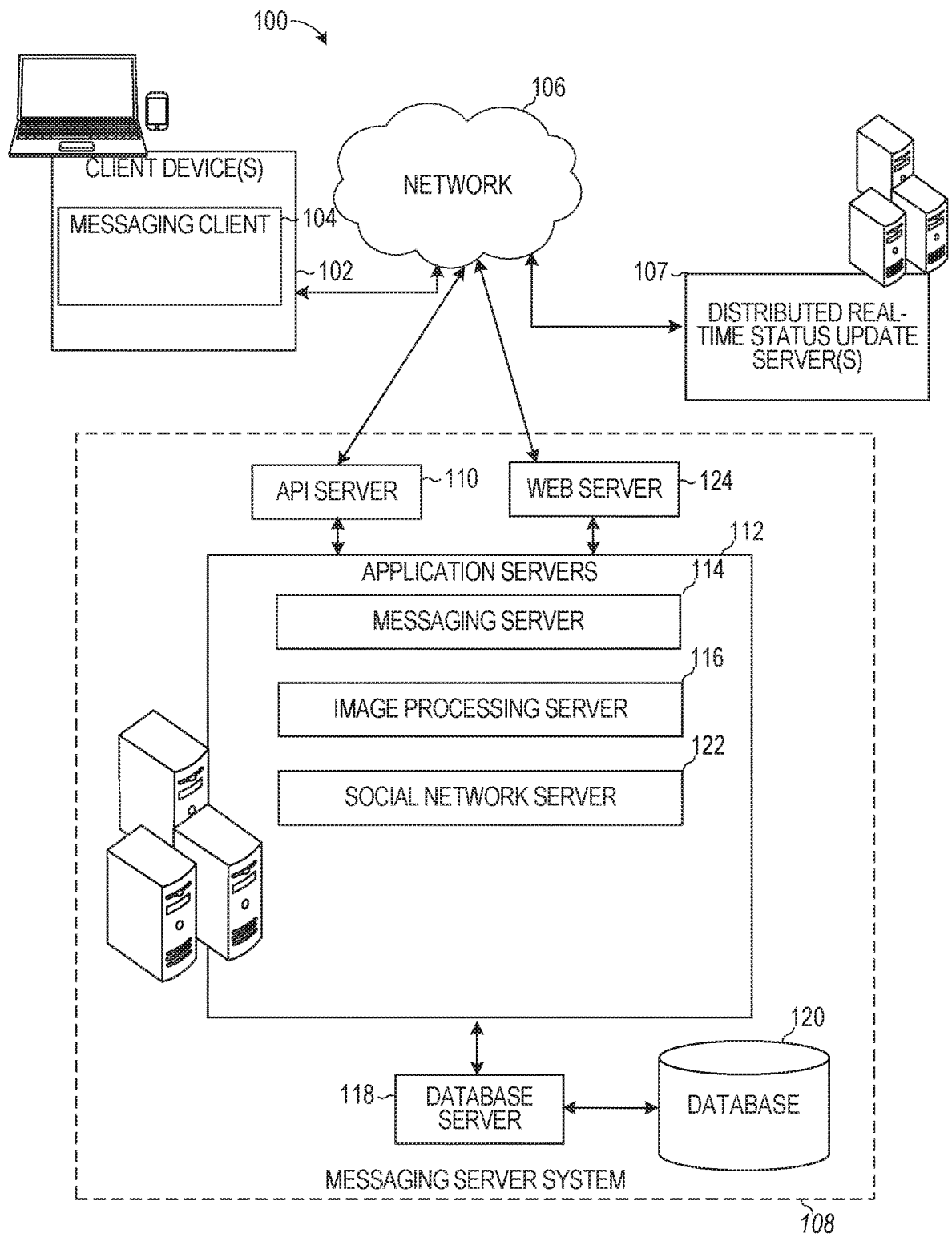
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art that examples may be practiced without these specific details. In general, well-known instruction instances, protocols, structures, and techniques are not necessarily shown in detail.

Typically, users access messaging applications not only to communicate with their friends but also to determine the current locations of their friends. Some messaging applications present the current locations as part of the chat interface where the users exchange messages and can also present the locations on an interactive map. For example, avatars representing the users can be positioned on the map at the respective locations of the various users. Obtaining the current locations of the friends consumes many computing and network resources. Specifically, the locations of each of the friends can be pushed to the particular user device which requires a large number of messages to be exchanged over a network. This can degrade network performance and unnecessarily consumes network bandwidth.

In some systems, the locations of the friends can be polled by a particular user device. For example, the user device can send a request to a server with an identifier of one or more friends to receive the current locations of the one or more friends. However, even in these systems, network bandwidth and system resources are wasted. Specifically, sometimes the locations of the friends which are being requested by a given user device may not change very frequently, and polling for locations of such friends result in the same location being sent back to the given user device which wastes system resources. In addition, delays attributed to polling or pushing locations of friends to various users are introduced, which reduces the accuracy of the locations that are being communicated. Namely, the location that is communicated to the requesting device may not reflect the actual current location of a given friend, such as if the friend is actively moving around. This makes such systems less attractive and degrades the overall user experience.

The disclosed examples seek to improve the efficiency and speed of providing status updates, such as location information, to client devices on a real-time basis using a distributed storage system. The distributed storage system uses real-time graph instance to store device objects that represent status information for various users, such as location information. The device objects communicate with each other through front-end instances. As a given user's location changes, that location is updated in the user's device object. The location is propagated in an intelligent and automated manner to device objects of the user's friends. When a given one of the user's friends requests the current location of the user, such as when the given friend opens an interactive map of avatars, the given friend's device communicates with a front-end instance to retrieve the location of the user device that is stored in the device object of the given friend. This reduces the overall network traffic and increases the rate at which location updates are communicated and exchanged. This way, lag between when a location is requested and when the location is provided to a given user, is minimized, which provides a real-time location sharing experience for the users.

Specifically, according to the disclosed examples, a front-end (FE) instance and a plurality of real-time graph (RTG) instances are stored on a distributed storage system. In some cases, multiple FE instances and multiple RTG instances can be stored, the FE instances may be scaled up/down based on load and number of client devices and the RTG instances are of a fixed size. Each of the plurality of RTG instances includes a plurality of device objects and the FE instance is configured to communicate with a client device associated with a first user. A bi-directional streaming remote procedure call (RPC) connection is established between the FE instance and the plurality of RTG instances. The FE instance receives a status update from the client device and determines that a first device object corresponding to the client device is stored on a first RTG instance of the plurality of RTG instances. The FE instances transmit a first message comprising the status update to the first RTG instance to update the first device object. The first device object identifies friends of the user and provides the status update to the device objects of the friends of the user. When a given friend of the user ultimately requests the status update, such as the location of the user, that information is readily available in the device object of the given friend and is communicated in real-time to the given friend's device.

In this way, according to the disclosed examples, the device resources (e.g., processor cycles, memory, and power usage) needed to accomplish a task with the device are reduced.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet). Messaging server system 108 may include a distributed real-time status update server(s) 107, in which case, each messaging client 104 receives status updates (e.g., location updates, location preference updates, online status updates, etc.) from the distributed real-time status update server(s) 107 via the messaging server system 108. In some implementations, all or a portion of the distributed real-time status update server(s) 107 is implemented externally to the messaging server system 108. In these circumstances, each messaging client 104 receives status updates (e.g., location updates, location preference updates, online status updates, etc.) from the distributed real-time status update server(s) 107 directly via the network 106.

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104, where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
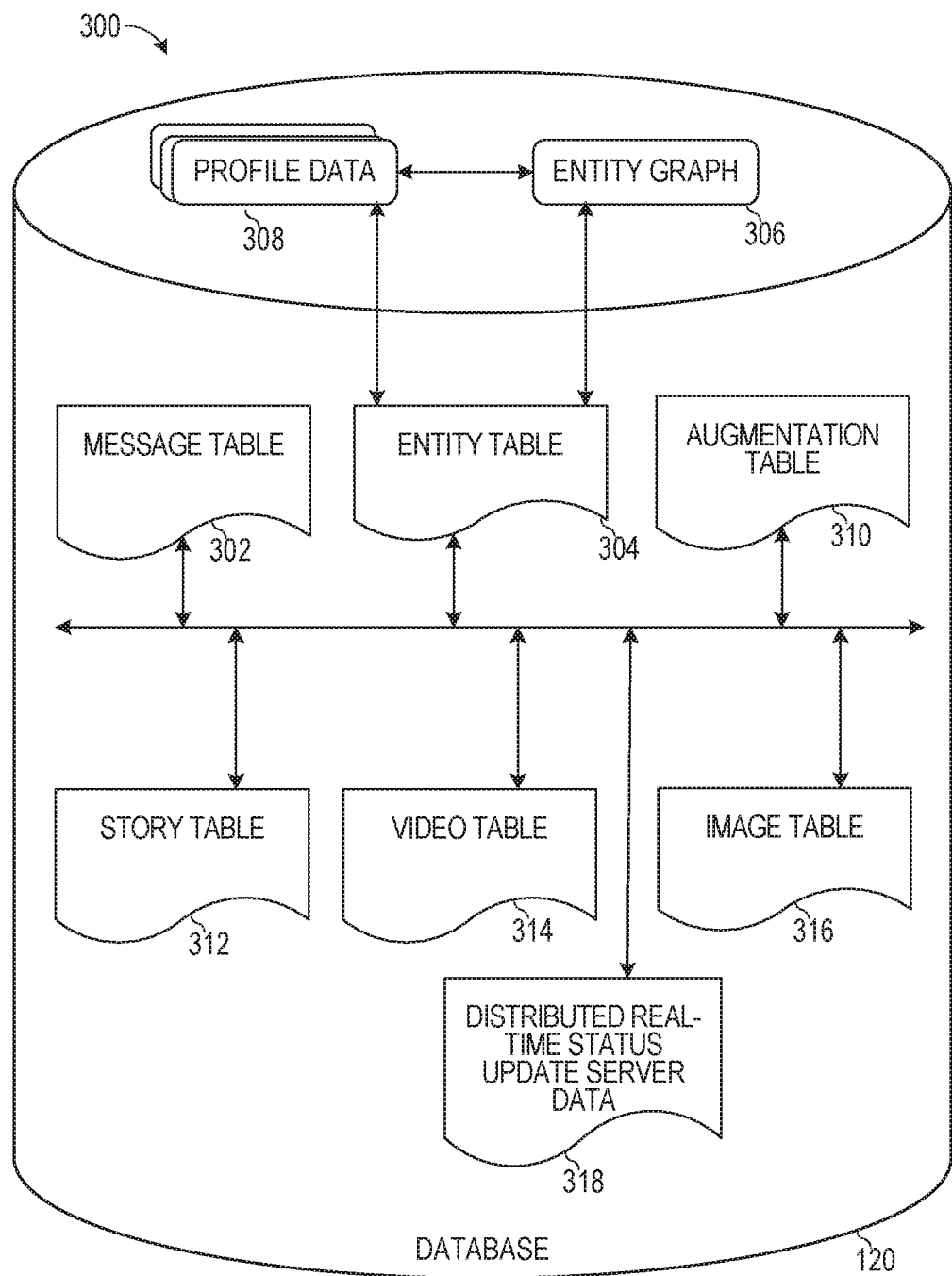
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

The distributed real-time status update server(s) 107 stores a real-time graph (RTG) of instances or nodes. These nodes maintain various information about different users of the messaging server 114. Client devices 102 receive updates, such as location updates, from friends in real-time from the distributed real-time status update server(s) 107. The distributed real-time status update server(s) 107 includes one or more front-end (FE) instances and one or more real-time graph (RTG) instances. When a given client device 102 initially connects to the distributed real-time status update server(s) 107 or when a message is directed to a user of a given client device 102, a FE instance is created and stored on the distributed real-time status update server(s) 107 for the client device 102. In some cases, an already existing FE instance is accessed in which case one need not be created when a client device 102 connects. This may happen if the client device 102 previously established a streaming connection to the FE instance or another FE instance. The FE instances are created on an as needed basis based on the load of the server(s) 107. This may include storing a unique device identifier for the client device or the user of the client device in the FE instance. The FE instance establishes a real-time link to the given client device 102 for exchanging information with the client device 102. The FE instance also establishes a bidirectional streaming real-time gRPC (remote procedure call) connection with each of a plurality of RTG instances.

In some examples, the FE instance receives an update (e.g., a location update) from the client device 102. In response, the FE instance identifies a device object that corresponds to the client device 102. Specifically, each RTG instance stores one or more device objects that correspond to various client devices 102 (e.g., physical devices). The FE instance accesses routing information that identifies which of a plurality of the RTG instances stores the device object for the client device 102. The FE instance then transmits the status update to the RTG instance that stores the device object for the client device 102 via the previously established gRPC connection.

The RTG instance receives the status update (e.g., a location update or updates to preference information, such as location sharing preferences) and identifies the device object that is to be updated for the client device 102. The RTG instance updates the corresponding status update stored in the device object with the received update. The device object processes the update and identifies a plurality of friends that are associated with the user of the client device 102 on the messaging system 100. The device object generates a plurality of messages directed to device object of the friends associated with the user, such as based on the current status of the respective device objects (e.g., whether the device object indicates the friend is active or inactive). The messages include the update to the status (e.g., the update to the location). In some cases, the device object first determines whether the status update satisfies certain criteria. For example, the device object determines whether a location included in the update differs from a previously stored location by more than a threshold amount. As another example, the device object determines whether a location included in the update was last updated more than a threshold amount of time ago (e.g., a timestamp of a previously stored location exceeds a current timestamp of the location in the update by more than a specified amount). As another example, the device object determines whether a location included in the update is to be shared with users based on their current status (e.g., whether the users are currently active or inactive, whether the users are currently reading messages or accessing an interactive map that presents locations of friends in real-time, a last connection time of the users, and so forth). If the status update satisfies the criteria or criterion, then the device object sends the messages to the device objects of the friends. In some cases, the criteria may be satisfied for a first group of friends and not satisfied for a second group of friends. In such cases, the device object sends the status update to the device objects of the first group of friends and delays sending or prevents sending the update to the device objects to the second group of friends altogether.

In some examples, the device object of a given friend resides or is stored on a different RTG instance (e.g., a second RTG instance) than the RTG instance that stores the device object of the user. In such cases, the device object of the user sends the message with the update directed to the device object of the friend to a randomly or pseudorandomly selected FE instance. In some cases, the FE instance is selected in a round-robin manner, where the FE instances are stored in a list, and the next FE instance that is adjacent to the FE instance to which a message was previously sent is selected. Once the last FE instance in the list is reached, the first FE instance in the list is selected to send a message to a device object. The FE instance receives the message and determines which of the plurality of RTG instances stores the device object of the given friend. The FE instance uses routing information stored in the FE instance to identify the second RTG instance that stores the device object. The FE instance then sends the message to the RTG instance that stores the device object. The RTG instance receives the message and updates the status of the user that is stored in the device object for the friend.

The device object stored on the RTG instance is automatically deleted from the distributed real-time status update server(s) 107 after a threshold time interval after a given client device 102 disconnects from the server(s) 107. Once the threshold time interval is reached, the information stored in the device object is moved to a different persistent storage device and a real-time connection with a client device 102 is terminated as well as the gRPC connections to the RTG instances. In this way, whenever a given friend has an update to their status, this update is propagated to the device object of users associated with the friend. When such users ultimately connect to the system (e.g., open the messaging client 104), the status information stored in the device objects for such users is made available to the users seamlessly and quickly. This avoids the need for the users to poll or wait to directly receive status updates from their friends as such information is updated in the device object for the users while the users are offline. In some cases, FE instances are created and deleted based on a load of the server(s) 107. A gRPC proxy object is generated and stored on the FE instances to communicate with a client device 102 over a gRPC connection. Such a proxy object provides information, such as status updates or information, from the client device 102 to a corresponding device object stored on the RTG instance. Once the connection between the gRPC proxy object and the client device 102 is terminated, the gRPC proxy object is deleted and the FE instance remains stored and available to handle further connections.

System Architecture

Figure 2:
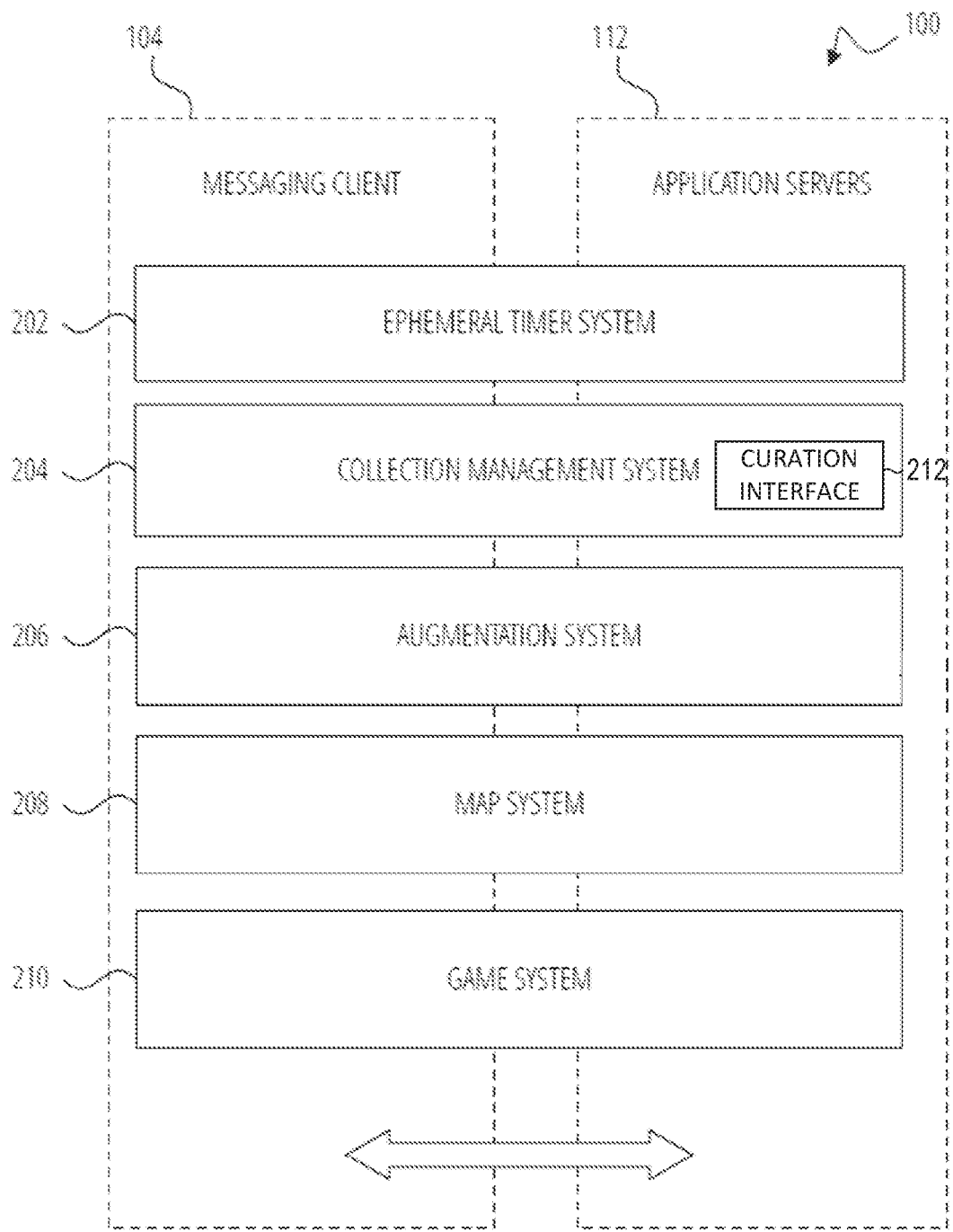
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the sever side by the application servers 112. These subsystems include, for example, an ephemeral timer system 202, a collection management system 204, an augmentation system 206, a map system 208, and a game system 210.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any one particular message, at least message sender data, message recipient (or receiver) data, and a payload. Further details regarding information that may be included in a message, and included within the message data stored in the message table 302, is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of objects' elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Distributed real-time status update server data 318 stores instances, nodes, and routing tables or information used by the distributed real-time status update server(s) 107. For example, the distributed real-time status update server data 318 stores FE instances, RTG instances, routing tables, proxy objects or nodes, device objects, and inter-region proxy instances or nodes.

Data Communications Architecture

Figure 4:
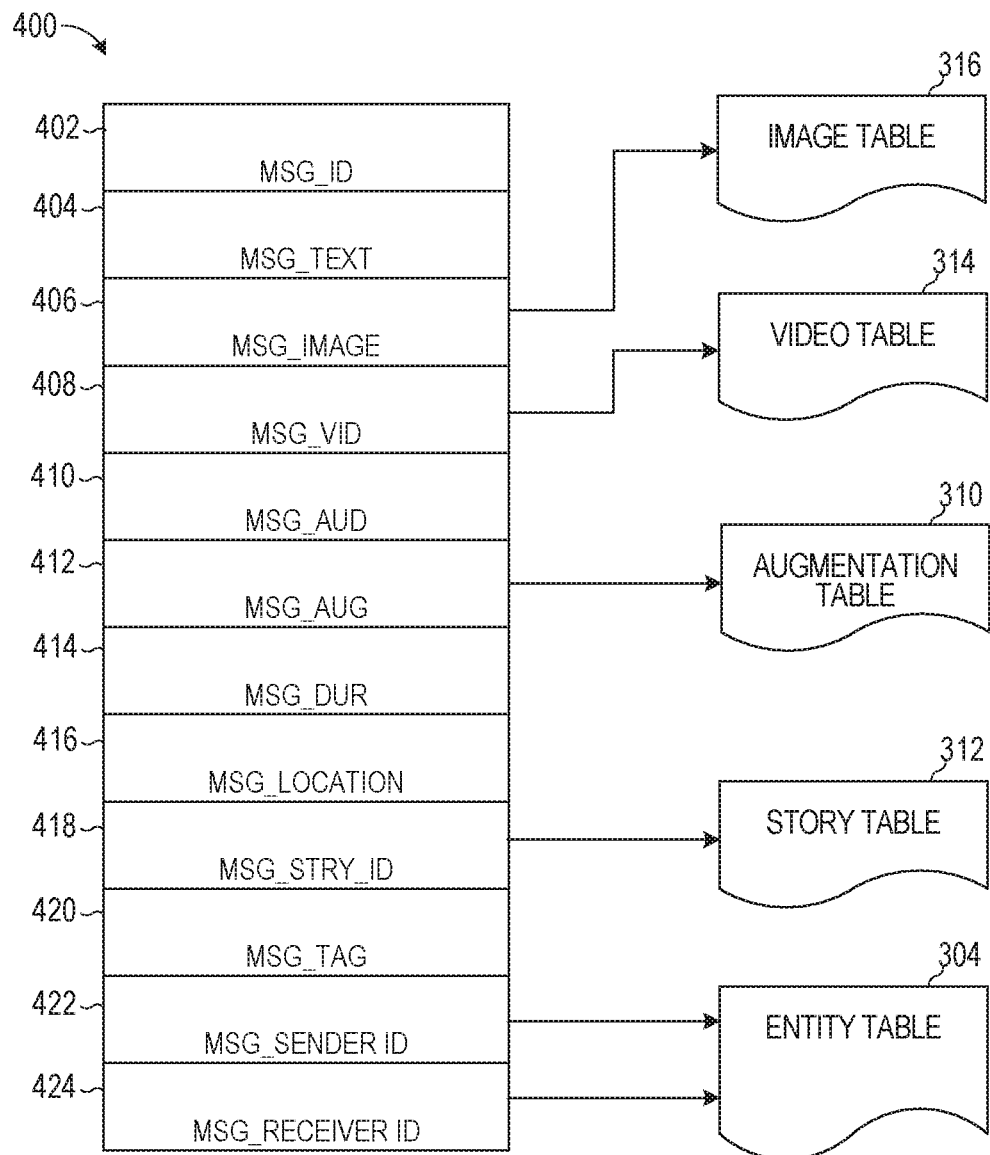
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 316.
- message video payload 408: video data, captured by a camera component or retrieved from a memory component of the client device 102, and that is included in the message 400. Video data for a sent or received message 400 may be stored in the video table 314.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentation data 412 may point to data stored in an augmentation table 310, values stored within the message story identifier 418 may point to data stored in a story table 312, and values stored within the message sender identifier 422 and the message receiver identifier 424 may point to user records stored within an entity table 304.

Figure 5:
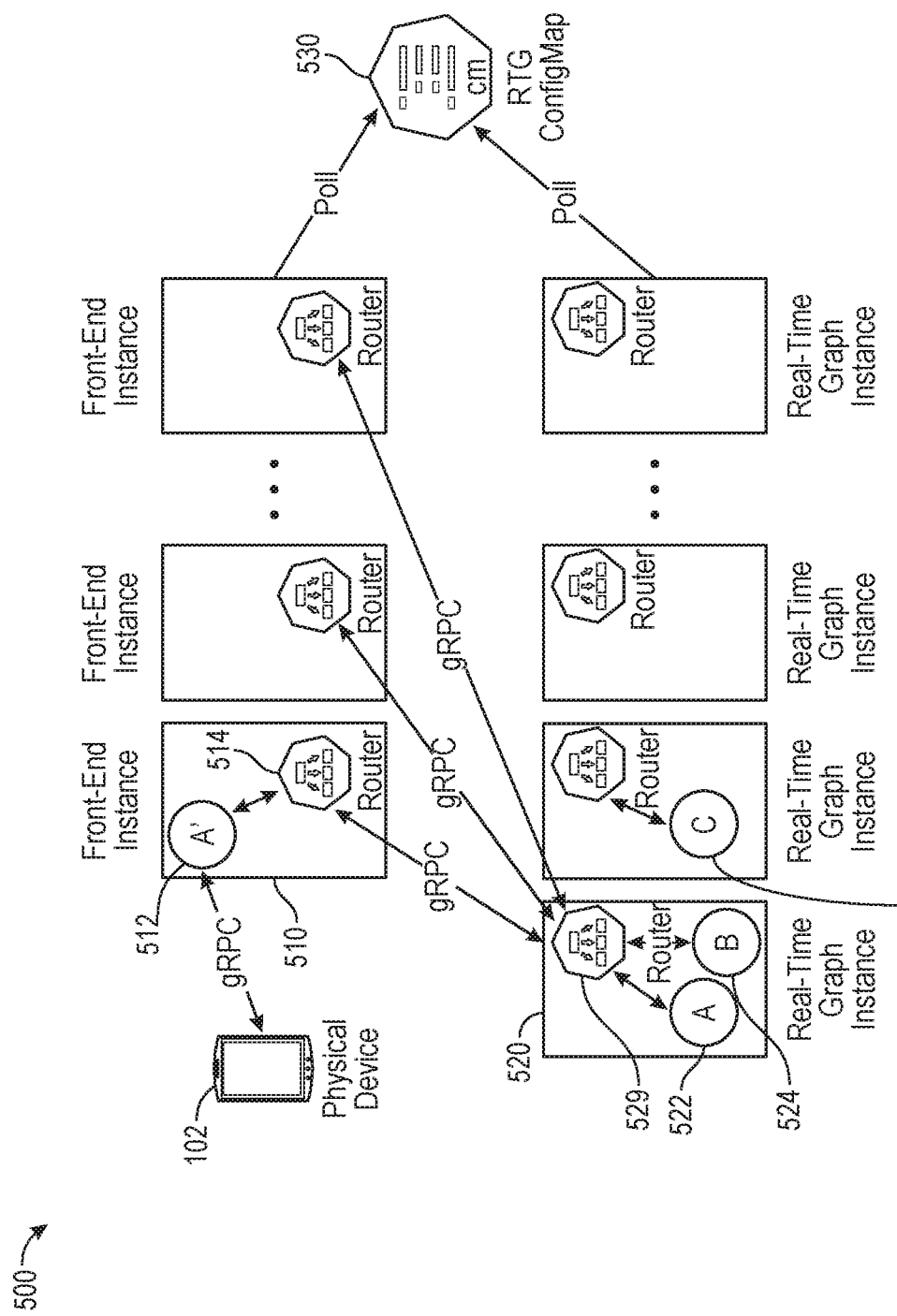
FIG. 5 is a diagrammatic representation of a distributed real-time status update server(s), in accordance with some examples.

FIG. 5 is a diagrammatic representation of a distributed real-time status update server(s) 107, in accordance with some examples. The distributed real-time status update server(s) 107 includes one or more FE instances 510, one or more RTG instances 520, and an RTG configuration map 530. A given client device 102 establishes a gRPC connection with a first FE instance 510. In one example, the given client device 102 establishes the gRPC connection with the first FE instance 510 when the given client device 102 opens a map interface or a chat interface of the messaging client 104. If the given client device 102 has not previously connected to the distributed real-time status update server(s) 107 or has connected more than a threshold time previous to the current time, a new FE instance 510 is created. The first FE instance 510 generates a proxy object 512 for communicating with the given client device 102. The proxy object 512 transmits messages from the given client device 102 to a corresponding device object stored on the first RTG instance 520.

The FE instance 510 obtains periodically and, upon generation of the FE instance 510, routing information from the RTG configuration map 530. The routing information identifies the storage locations of a plurality of device objects across a plurality of RTG instances 520. The FE instance 510 determines whether an identifier of the client device 102 is included in the obtained routing information. If so, the FE instance 510 receives an update from the client device 102 via the proxy object 512 and sends the update to the device object associated with the client device 102 that is stored on the RTG instance. For example, the FE instance 510 determines that a first device object 522 corresponds to the identifier of the client device 102 and that the first device object 522 is maintained or stored on a first RTG instance 520. In such cases, the proxy object 512 on the FE instance 510 sends updates to the first device object 522 by sending a message directed to the first device object 522 to the first RTG instance 520. The first RTG instance 520 also sends back information stored in the first device object 522 to the FE instance 510 that is connected to the client device 102 associated with the first device object 522. To do so, the first RTG instance 520 determines the unique random identifier assigned to the proxy object 512 from which the message is received and stores that identifier in the routing information 529. The first RTG instance 520 uses the identifier stored in the routing information 529 to identify the FE instance 510 and proxy object 512 that is currently connected to the client device 102. The FE instance 510 provides the information received from the RTG instance 520 (the contents of the device object 522) via the proxy object 512 to the client device 102 which then updates a graphical user interface (e.g., updates locations of friends on a map in real-time).

The FE instance 510 may determine that an identifier of the client device 102 is missing from or is not included in the obtained routing information. In such cases, the FE instance 510 instructs one of the RTG instances 520 to generate a new device object for the client device 102. The FE instance 510 then provides data via the proxy object 512 to the device object from the client device 102 or provides data to the client device 102 from the device object.

Each RTG instance 520 stores one or more device objects. For example, a first RTG instance 520 stores the first device object 522 and a second device object 524. A second RTG instance stores a third device object 526. Each RTG instance 520 obtains periodically routing information 529 that identifies which device objects are stored in the respective RTG instance 520. The routing information 529 indicates a range of device identifiers handled by each respective RTG instance 520. The first device object 522 may process an update received from a client device 102 and identify one or more friends stored on the first device object 522. The first device object 522 generates messages that include the update for transmission to the device objects of the friends. A first message can be sent to the second device object 524 directly within the first RTG instance 520. A second message that needs to be delivered to the third device object 526 may be transmitted to the third device object 526 via one or more FE instances 510. Namely, the third device object 526 may be on an RTG instance that is external to the RTG instance 520 that stores the first device object. In such cases, the RTG instance 520 selects in a random or cyclic or round-robin manner a given FE instance 510 or proxy object on one of the FE instances. The RTG instance 520 sends the message with an identifier of the third device object 526 to the selected FE instance 510 or proxy object. The selected FE instance 510 receives the message and determines which of the RTG instances stores the third device object 526 based on the routing information 514 stored on the selected FE instance 510. The message is then sent by the selected FE instance 510 or proxy object to the identified or determined RTG instance that stores the third device object 526 to update the information for the user associated with the first device object 522.

As an example, the first device object 522 may update a location of the client device 102. This location update may be shared with other friends of the user of the client device 102. The third device object 526 may store a list of friends and their respective locations. When the third device object 526 receives an update to the location from the first device object 522, the third device object 526 identifies the user associated with the first device object 522 and updates the current location stored for the user. An FE instance 510 may establish a connection with a client device 102 of a friend using another proxy object stored in the FE instance 510 corresponding to the third device object 526. Upon establishing the connection, the locations of the friends stored in the third device object 526 are provided to the client device 102 of the friend to update a graphical user interface presented on the client device 102. In this way, users can receive almost instant updates to locations of their friends on a map and see their friends actively moving on the map.

In some examples, the FE instance 510 (e.g., proxy object stored on the FE instance 510) is assigned a random identifier when the FE instance 510 is initially generated and stored. Each device object that is stored in the RTG instances is assigned an identifier corresponding to the user identifier associated with the device object. For example, the first device object 522 is associated with a user of a client device 102 and is assigned an identifier that matches the user identifier of the user of the client device 102 (e.g., a username). In some cases, the FE instances only communicate with RTG instances and do not communicate or exchange messages directly with each other. In some implementations, the first RTG instance 520 stores the random identifier of the proxy object 512 stored on the FE instance 510 that transmitted a message to the first RTG instance 520. When any device object in the first RTG instance 520 needs to send a message back to the proxy object 512, the first RTG instance 520 uses the stored random identifier to find and route the message to the appropriate proxy object and then to the corresponding client device 102.

The arrangement and interaction between FE instances 510 and RTG instances 520 makes it possible to have many thousands of device objects in memory without the need to perform complex synchronization operations. It also makes the system scalable and allows objects to reside anywhere geographically and on various storage devices in a distributed manner.

In some examples, groups of FE instances 510 and RTG instances 520 are divided into different geographical regions. For example, a first group of FE instances 510 and RTG instances 520 are stored in a first geographical region (e.g., the United States of America) and a second group of FE instances 510 and RTG instances 520 are stored in a second geographical region (e.g., Australia). Messages that are exchanged between FE instances 510 and RTG instances 520 in the first group within the same geographical region are sent in real-time. Messages that are exchanged between an FE instance 510 in the first group and an FE instance 510 in the second group are grouped and sent in bulk periodically. In this way, the number of times messages are sent between different geographical regions is reduced which better utilizes network resources and bandwidth.

Figure 6:
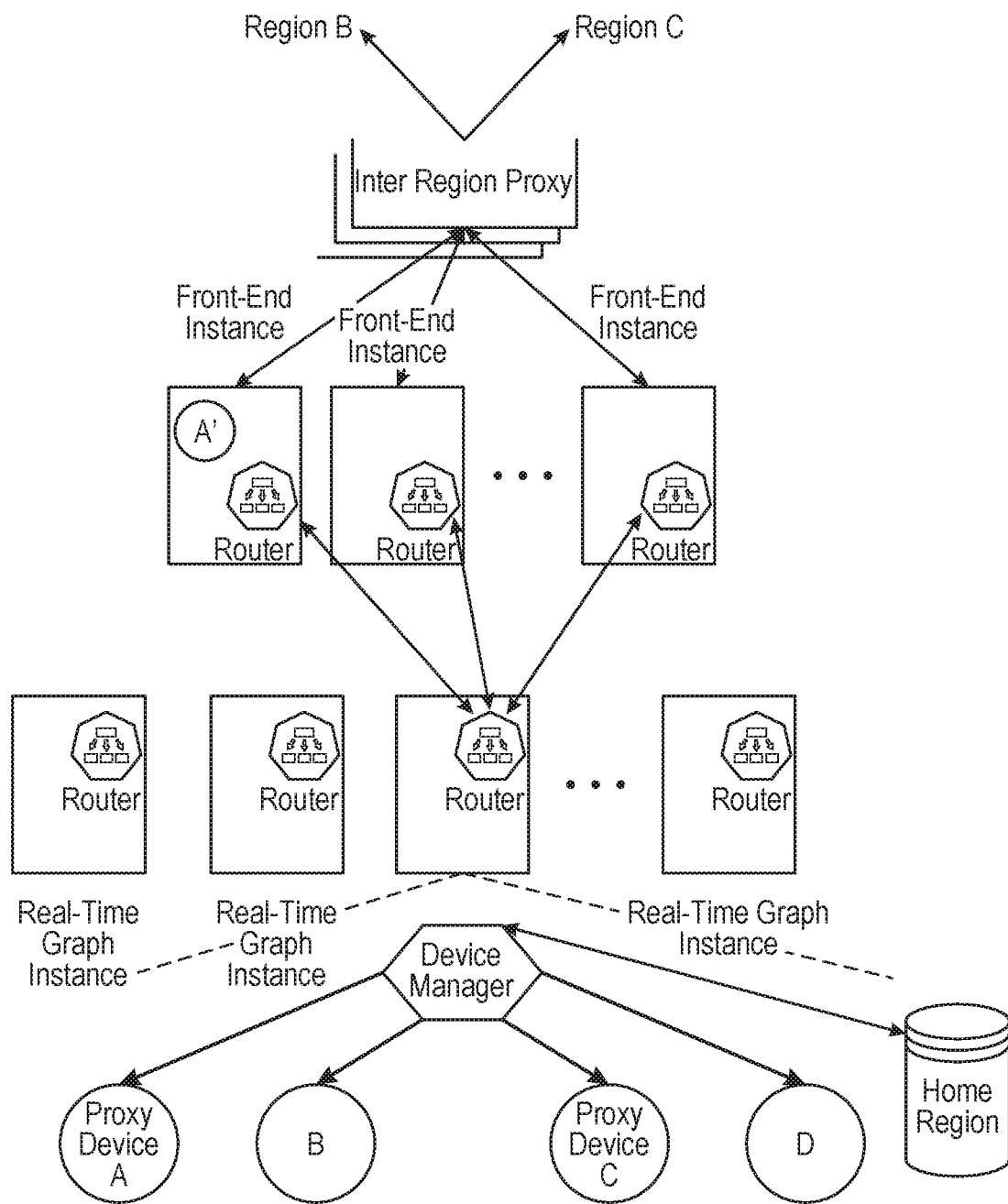
FIG. 6 is another diagrammatic representation of a distributed real-time status update server(s), in accordance with some examples.

FIG. 6 is a diagrammatic representation of a distributed real-time status update server(s) 107 across different geographical regions, in accordance with some examples. Specifically, users are associated with regions in which they are geographically located. For example, a first user in a first geographical region is associated with a device object in the first geographical region. A second user in a second geographical region is associated with a device object in the second geographical region. The mapping between users and the regions in which they are located and consequently their respective device objects are located is stored in a globally replicated database table. This table is shared and copied across the various geographical regions. In some cases, the mapping is updated periodically or in real-time as users move around to different geographical regions. In response to determining that a user has changed geographical regions, a device object stored for the user in a first geographical region is moved or copied to the RTG instance in the geographical region corresponding to the new user location. In some implementations, the device object is moved or copied and the geographical region assigned to the user is updated immediately or after the user has remained in the new geographical region for a threshold number of days.

In some examples, the first device object 522 in a first geographical region may generate a message directed to a second device object that is in a second geographical region. Specifically, the first device object 522 looks up in the globally replicated database the user identifier associated with the second device object to determine whether the second device object is in the first geographical region. If the second device object is determined to be in the first geographical region, the first device object 522 transmits the message to the RTG instance in which the second device object is stored. If the second device object is determined to be in the second geographical region, the first device object 522 identifies a first inter-region proxy node corresponding to the second region. The first inter-region proxy node may be located in the first geographical region or any other suitable location. The first device object 522 sends via an FE instance 510 to the inter-region proxy node the message with an identifier of the second user and the second device object to the identified inter-region proxy node.

The first inter-region proxy node collects and bundles a plurality of messages that are directed from the first geographical region and other geographical regions. Once the first inter-region proxy node determines that a threshold period of time has elapsed since the last time the first inter-region proxy node sent a message to a second inter-region proxy node located in the second geographical region, the first inter-region proxy node sends the collected and bundled plurality of messages to the second inter-region proxy node. In some implementations, once the first inter-region proxy node determines that a threshold number of collected messages has been reached, the first inter-region proxy node sends the collected and bundled plurality of messages to the second inter-region proxy node. The second inter-region proxy node located in the second geographical region receives the bundled messages from the first inter-region proxy node and distributes the messages (e.g., randomly) to FE instances in the second geographical region. Specifically, an FE instance in the second geographical region receives the message from the second inter-region proxy node directed to the second device object and identifies an RTG instance in the second geographical region that includes the second device object. The FE instance provides the message to the second device object via the identified RTG instance.

Figure 7:
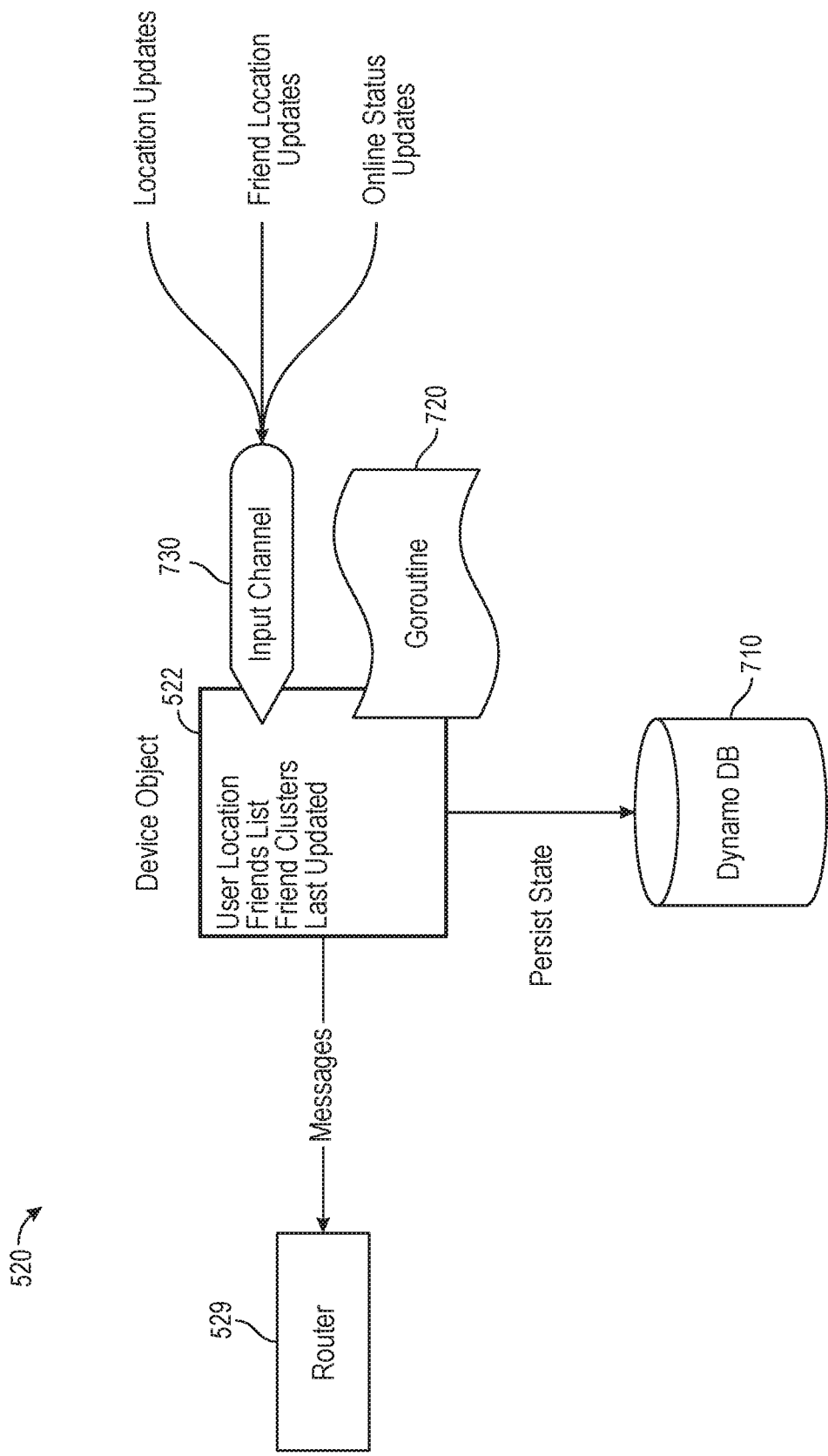
FIG. 7 is a diagrammatic representation of an RTG instance, in accordance with some examples.

FIG. 7 is a diagrammatic representation of an RTG instance 520, in accordance with some examples. The RTG instance 520 is an example of one of the many RTG instances discussed in connection with FIGS. 5 and 6. As an example, the RTG instance 520 includes a router 529, a device object 522, an input channel 730, a goroutine 720 (or coroutine) and can communicate with a remote database 710. In one example, the device object 522 stores various information for a given user, such as the last known location of the user, a friends list of the user, friend clusters for the user, the last update time of the device object 522, status and location information for each friend in the friends list or friend clusters.

The device object 522 receives messages via the input channel 730. For example, the device object 522 receives a location update for the user associated with the device object 522 or a friend of the user stored in the friend list. The device object 522 receives online status updates for one or more friends of the user listed in the device object 522. The goroutine 720 (or coroutine) can manipulate the device data that is stored in the device object 522. It does so by iterating through the messages received via the input channel 730 and acting on them based on message type. At some point, the goroutine 720 may decide that the device object is no longer needed. When this happens the device object is deleted from the graph and the goroutine 720 is terminated. The goroutine 720 copies any relevant information that is stored in the device object 522 to the remote database 710. This information may be associated with the user identifier corresponding to the device object 522 and is retrieved and copied to a new device object 522 when the new device object 522 is created for the same user at some later time.

The device object 522 for a given user is generated whenever a streaming gRPC connection is established between a client device 102 and the distributed real-time status update server(s), such as with a proxy object in FE instance 510. In some cases, the device object 522 for the given user is generated when a friend of the user sends a message directed to the given user. On startup, when the device object 522 is initially created, the device object 522 retrieves an initial friends list from the messaging server 114. Then, the device object 522 sends a message to every device object corresponding to a friend in the initial friends list. Namely, the device object 522 identifies user identifiers of each friend in the list and sends a message to each device object associated with a respective one of the identified user identifiers. In some cases, the device object 522 only sends the message to those friends who are determined to be in an active state (e.g., users who are currently online). The message announces that the device object 522 has just come online.

After sending messages announcing that the device object 522 has come online, the goroutine 720 starts processing messages received on the input channel 730 in a specific loop. The loop includes processing input messages, if any, depending on the types of the message. Namely, different functions may be performed for different types of messages. The goroutine 720 then checks for expired friend locations and deletes such locations if any are expired. The goroutine 720 checks if the state needs to be persisted. The state is persisted if it is dirty and if it has not been persisted for a threshold period of time. Next, the goroutine 720 checks for preferences that need to be refreshed periodically. Optionally, the goroutine 720 next accesses a second remote source (e.g., third-party source) of user locations to pull or determine the current location of the user associated with the device object 522. If the goroutine 720 determines that the pulled location from the second remote source is different by some factor (e.g., exceeds a distance relative to the current location stored for the user in the device object 522), the goroutine 720 updates the current location based on that location retrieved from the second remote source. Finally, the goroutine 720 checks for inactivity of the client device 102 or user associated with the device object 522. If the device or user was inactive for a threshold period of time (e.g., 8 hours), such as if no messages have been received on the input channel 730 of the device object 522, information from the device object 522 is moved to the remote database 710 and associated with the identifier of the user corresponding to the device object 522. The device object 522 is then deleted and the goroutine 720 is terminated. If the device or user was not inactive for the threshold period of time, the goroutine 720 restarts the loop including processing input messages on the input channel 730.

Figure 8A:
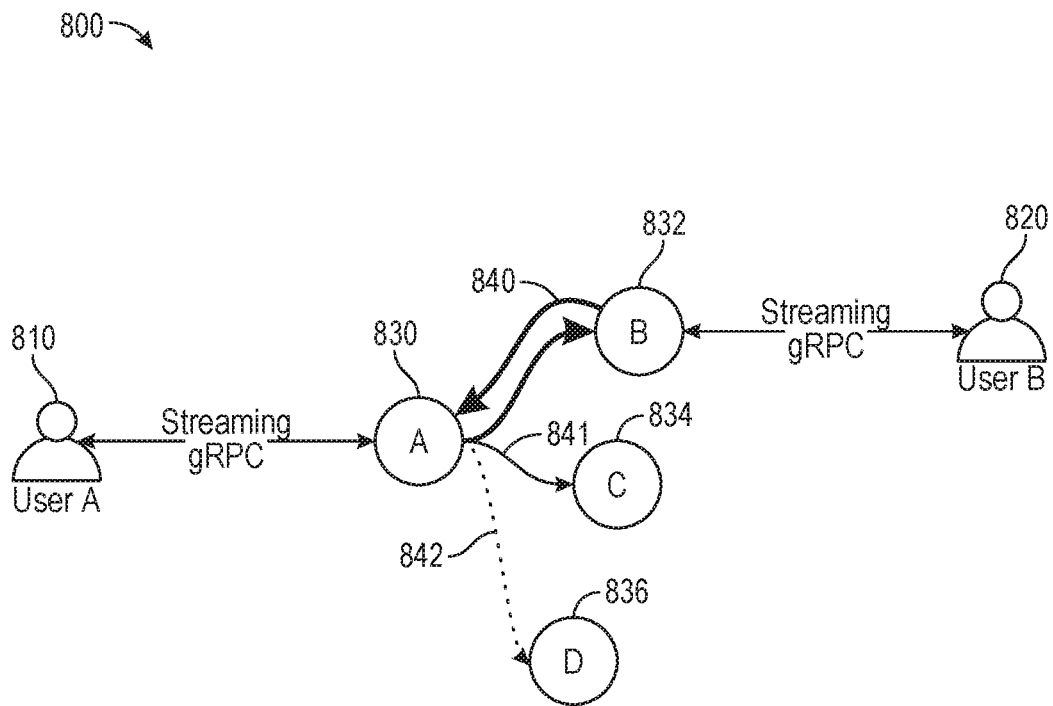
FIGS. 8A-8C are diagrammatic representations of message exchanges between device objects of distributed real-time status update server(s), in accordance with some examples.

FIG. 8A is a diagrammatic representation of message exchanges between device objects of distributed real-time status update server(s), in accordance with some examples. As shown in FIG. 8A, a first user 810 (e.g., a first client device 102 of the first user 810) sends an update (e.g., a status update or location update) via a streaming gRPC connection to a first device object 830 associated with the first user 810. The links between the nodes shown in FIG. 8A show the direction of the data flow and thicknesses of the links show the types of connections (e.g., real-time data exchanges or rate-limited data exchanges).

In one example, the first device object 830 receives a location update from the first user 810. In response, the first device object 830 pushes the location update to a second device object 832 corresponding to the second user 820. The second user 820 also provides a location update to the second device object 832 associated with the second user 820. The second device object 832 also pushes the location update from the second user 820 to the first device object 830 over the streaming gRPC connection 840. Once the first device object 830 receives the update to the location from the second device object 832, the first device object 830 identifies an entry in the first device object 830 that corresponds to the second user 820 and updates the location stored in the entry with the updated location received from the second device object 832.

The first device object 830 also pushes the location update to a third device object 834 corresponding to a third user. The third user may not be sending location updates back to the first user and, in such circumstances, the third device object 834 only receives the location update from the first device object 830 but does not send back location information to the first device object 830.

In some implementations, the location updates are exchanged between the first device object 830 and the second device object 832 in real-time. Namely, as the first device object 830 receives a location update from the first user 810, the first device object 830 immediately sends the update to the second device object 832. This may be performed in response to the first device object 830 determining that the second user 820 associated with the second device object 832 has a status indicating that the second user 820 needs real-time location information. For example, if the second user 820 is currently viewing an interactive map that displays locations of friends of the second user 820, this status is transmitted and stored in an entry for the friend in the first device object 830. The first device object 830 based on determining that the status of the second user 820 is viewing an interactive map that displays locations of friends, sends updates to the location received from the first user 810 in real-time as updates are received to the second device object 832. Also, the second device object 832 determines that the first user 810 is also viewing the interactive map of locations of friends and so may share the location updates received from the second user 820 in real-time with the first device object 830.

The first device object 830 may store a status for the third user associated with the third device object 834 indicating that the third user currently has the messaging client 104 open but is not viewing the interactive map that displays locations of friends. In this case, the first device object 830 may send or share the location updates received from the first user 810 periodically with the third device object 834 rather than in real-time over a rate-limited link 841. Namely, the first device object 830 may only send updates to the locations of the first user 810 to the third device object 834 if the location of the first user 810 satisfies a first condition (e.g., changes by more than a first threshold amount or if the location was last sent to the third device object 834 more than a first threshold amount of time ago (e.g., the elapsed time since the last update to the location was sent to the third device object 834 exceeds a first threshold)). This way, location updates of the first user 810 may be sent in real-time to some users but periodically or not at all to other users simultaneously.

The first device object 830 may store a status for a fourth user associated with a fourth device object 836 indicating that the fourth user is currently inactive. In this case, the first device object 830 may send or share the location updates received from the first user 810 periodically with the fourth device object 836 rather than in real-time over a further rate-limited link 842 or may not share the location at all. Further rate-limited link 842 is rate-limited further than the rate-limited link 841. The rate-limited link 841 may allow exchanges of locations or locations to be sent to the third device object 834 when a first condition is satisfied. The further rate-limited link 842 may allow exchanges of locations or locations to be sent to the fourth device object 836 when a second condition is satisfied and the first condition is not satisfied. Namely, the first device object 830 may only send updates to the locations of the first user 810 to the fourth device object 836 if the location of the first user 810 satisfies a second condition (e.g., changes by more than a second threshold amount or if the location was last sent to the fourth device object 836 more than a second threshold amount of time ago (e.g., the elapsed time since the last update to the location was sent to the fourth device object 836 exceeds a second threshold)). Specifically, the location updates shared with the fourth device object 836 may be further restricted relative to those location updates shared with the third device object 834 because the fourth user does not have a need to see location information for the first user 810. The second threshold amounts that are used to restrict the updates sent to the fourth device object 834 are greater than the first threshold amounts used to restrict the updates sent to the third device object 834.

Figure 8B:
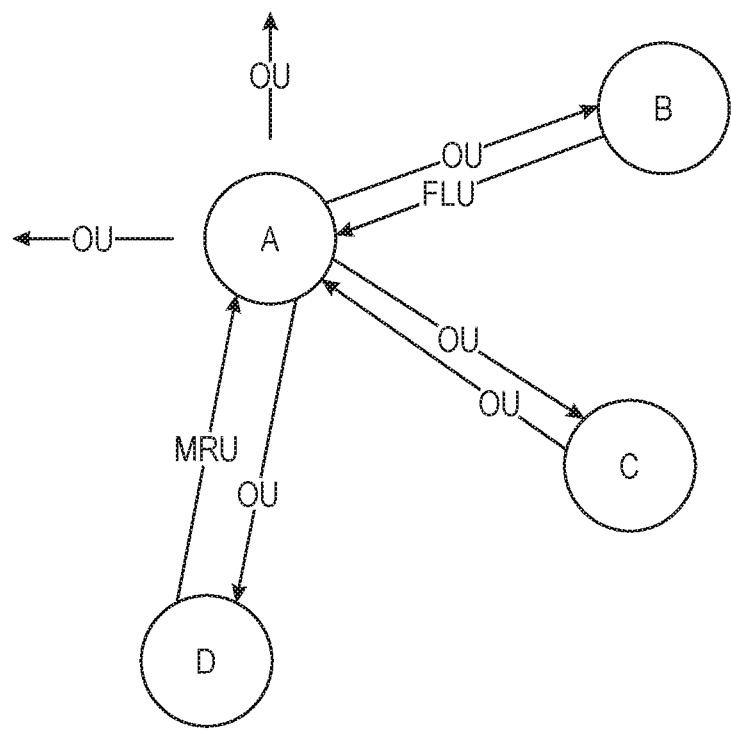

FIG. 8B is a diagrammatic representation of message exchanges between device objects of distributed real-time status update server(s), in accordance with some examples. As shown in FIG. 8B, online update (OU) represents messages sent between device to announce their online presence and then periodically to indicate that a device object is still online. Online updates are sent to the device objects from a client device 102 when the client device 102 comes online. Location update (LU) is sent to a device object when a client device 102 transmits a location update. A friend location update (FLU) is sent between device objects when a user shares a location with their friends. A delete location update (DLU) is sent when a device object wants all other device objects to delete its location, such as when a given user enters ghost mode and does not want their location to be known. Preferences update (PU) is sent when preferences for a user are updated so that the device object retrieves and updates stored preference. Message received update (MRU) is sent to acknowledge message receipt between device objects.

FIG. 8B provides an example message exchange when a device object initially comes online. When the device object (e.g., device object A) comes online and is first initialized, the device object sends online update (OU) to all of its friends (e.g., device objects B, C and D of the friends of device object A). Each friend device object B, C, and D responds in one of three ways. For example, a first friend object B response with an FLU which indicates the location of the friend stored in the first friend object B. This happens when the device object receiving the OU is sharing its location with the device object of the user from which OU message was received. The device object A then stores the location received in the FLU message from first friend object B in an entry for the first friend in the device object A.

A second friend object C responds to the OU message received from device object A with an online update (OU). This happens when the device object receiving the OU is not sharing the location with the device object A from which the OU message was received but is online (e.g., has a client device 102 physically connected to the second friend object C via a corresponding FE instance 510) and is interested in receiving location updates from the user associated with the device object A. Namely, the second friend may desire to see or know the location of the user associated with the device object A but may not be interested in sharing their location with the user associated with the device object A.

A third friend object D responds to the OU message received from device object A with an MRU message. This happens when the device object receiving the OU is not sharing the location with the device object A from which the OU message was received and is also not interested in receiving location updates from the user associated with the device object A, such as because the third friend object D is offline (e.g., does not have a client device 102 physically connected to the third friend object D via a corresponding FE instance 510). Namely, the third friend may not desire to see or know the location of the user associated with the device object A and may not be interested in sharing their location with the user associated with the device object A.

Figure 8C:
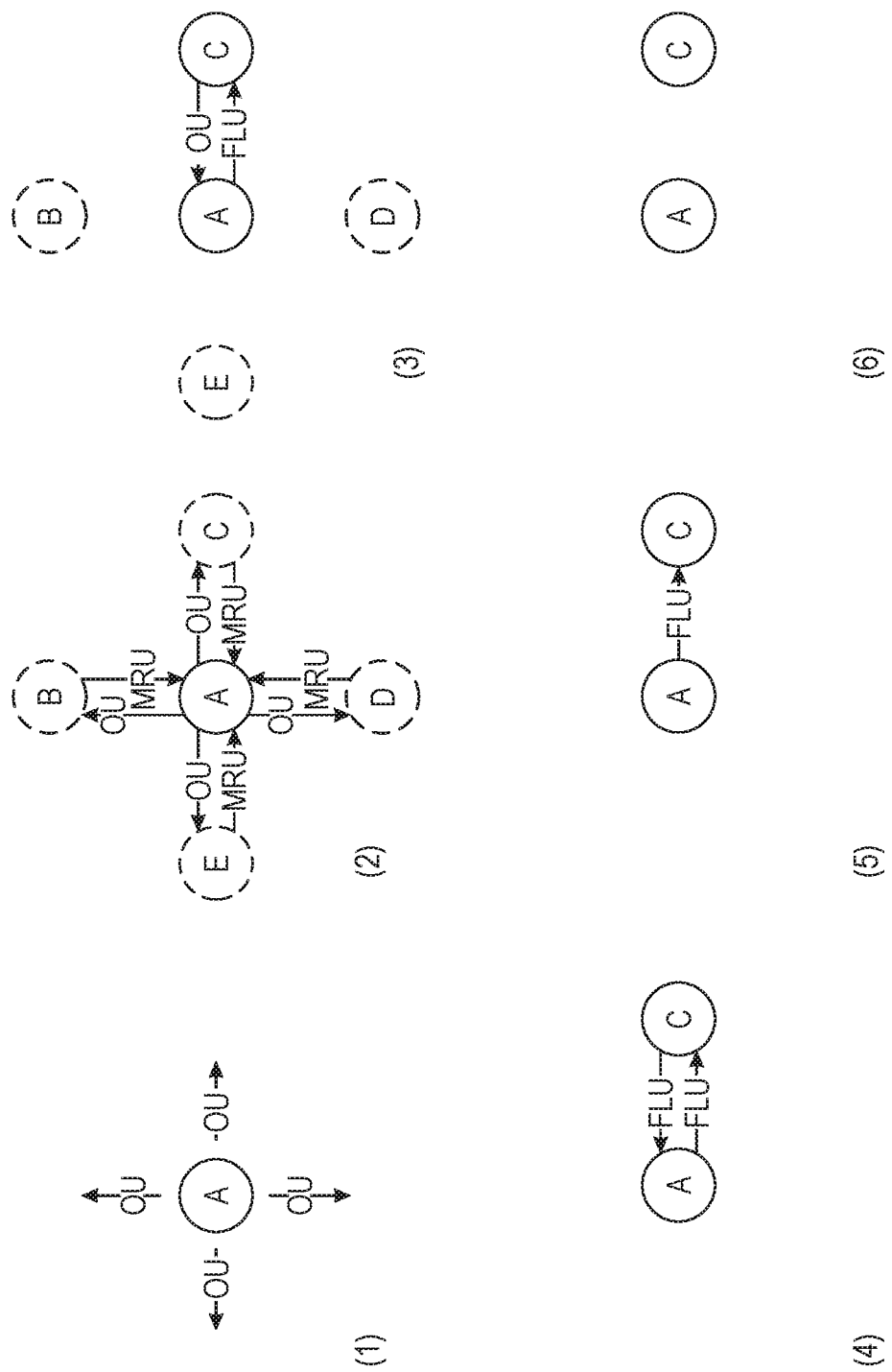

FIG. 8C is a diagrammatic representation of message exchanges between device objects of distributed real-time status update server(s), in accordance with some examples. As shown in FIG. 8C, in step 1: device object A initially comes online and transmits OU messages to all of the friends listed in the device object A. In step 2: to handle each OU message received from the device object A, a new device object (e.g., an offline device object, represented by a dashed circle) is created (B, C, D, and E) for each of the friends. Since none of the friends is online or has a recent location to share, each of the device objects B, C, D, and E responds to the OU message received from device object A with an MRU message.

In step 3: a given friend has a client device 102 that establishes a connection to the device object C via an FE instance 510. This results in device object C coming online—the device object C is switched from being an offline device object to an online device object (represented by a solid circle). In response, device object C transmits an OU message to all of the friends of device object C including device object A. The device object A responds to the OU message received from device object C with an FLU message to indicate to the device object C the current location of the user stored in the device object A. In step 4: device objects A and C establish connections based on the fact that they both are online and sharing locations with each other. They continue exchanging FLU messages to provide location updates to each other. At the same time, the other device objects B, D and E are deleted after a period of inactivity or after a threshold period of time has elapsed since an event associated with the device objects has taken place. For example, device object B is deleted if a threshold amount of time has elapsed since the device object B was created and a corresponding client device 102 has not established a connection with an FE instance 510 within the threshold amount of time to bring the device objects online. As another example, device object C is deleted if a threshold amount of time has elapsed since the device object C was created and further messages have not been received by the device object C (e.g., from other users or further messages from device object A).

In some examples, an offline device object only stores the location information or location sharing preferences of a corresponding user. An online device object includes additional information not included in the offline object, such as, a list of friends of the first user, status of connection of the client device with the first device object, status of connection of client devices of the friends with respective device objects, a last time when each of the friends was active, a thread of execution that provides an estimate of the location of the first user and estimated locations of the friends.

In step 5: the device object C goes offline (e.g., because the client device 102 that initially connected to the device object C via the FE instance 510 has been disconnected for a threshold period of time). In response, the device object C stops sending FLU messages to device object A but device object A continues sending FLU messages to device object C for a threshold period of time. In step 6: since device object A has not received FLU messages from device object C for a threshold period of time, device object A stops sending FLU messages to device object C. Device objects A and C are deleted from the graph after they stop processing messages for some time (e.g., they did not receive messages from other device objects or they did not receive messages from a client device 102 associated with the respective device objects).

While FIGS. 8B and 8C were discussed in terms of location updates being shared, similar functionality apply to sharing any other type of update (e.g., status updates). In this case, instead of sending FLU messages and LU messages, the device exchange status update messages or preference update messages.

Figure 9:
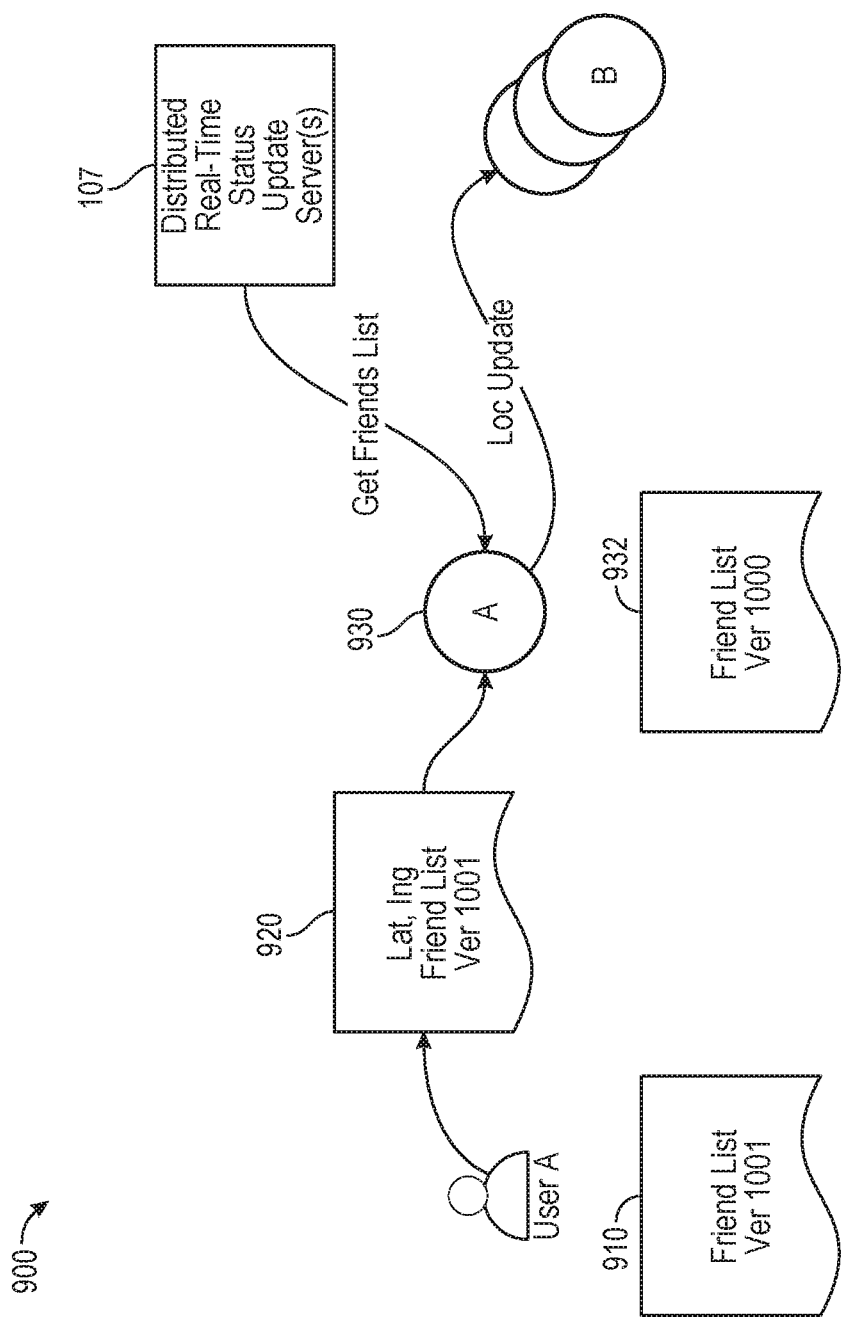
FIG. 9 is a diagrammatic representation of sending updates based on different friend list versions, in accordance with some examples.

FIG. 9 is a diagrammatic representation of sending updates based on different friend list versions, in accordance with some examples. In some examples, with every location update (LU) message a given client device 102 provides and sends to the corresponding device object, the client device 102 also provides a friends list version number. This ensures that the friends list that the device object of the client device 102 uses to send location updates to other device objects reflects the most recent changes to the user's friends list. This way, if a given user deletes a friend or temporarily desires to preclude the friend from receiving location updates from the user, the device object of the given user does not continue sharing the location updates based on a stale copy of the friends list or preferences.

For example, as discussed above, on startup, the device object 930 for a given user (user A) retrieves the current friend list 932 from the messaging server 114. This is the friends list that the device object 930 uses to send OU messages to the friend device objects. At this point, the client device 102 associated with the device object 930 also has the same friends list and thus both share the same version number (e.g., 1000). At some later point, the user A updates the friends list (e.g., unfriends a person on the friends list). In response, the client device 102 updates (increments) the version number of the friends list and creates a friends list 910 with a new version number. The update is sent to the messaging server 114. Shortly thereafter, the client device 102 sends a location update 920 to the distributed real-time status update server(s) 107 and specifically to the device object 930. This location update 920 includes the new version number of the friends list. The device object 930 compares the version number received from the location update with the current version number that is stored on the device object 930. In response to determining that the version number that is stored on the device object 930 differs from the version number of the friends list received in the location update, the device object 930 prevents temporarily further location updates (FLU messages) from being sent to the friend device objects (B, C, D, and E).

The device object 930 communicates with the messaging server 114 or the client device 102 to obtain the latest friends list corresponding to the version number received in the location update. This synchronizes the friends list stored on the device object 930 with the friends list stored or recently changed by the user of the client device 102 corresponding to the device object 930. Once the friends list is updated, the device object 930 continues to send the FLU messages with the location update to the friends on the updated friends list.

Figure 10A:
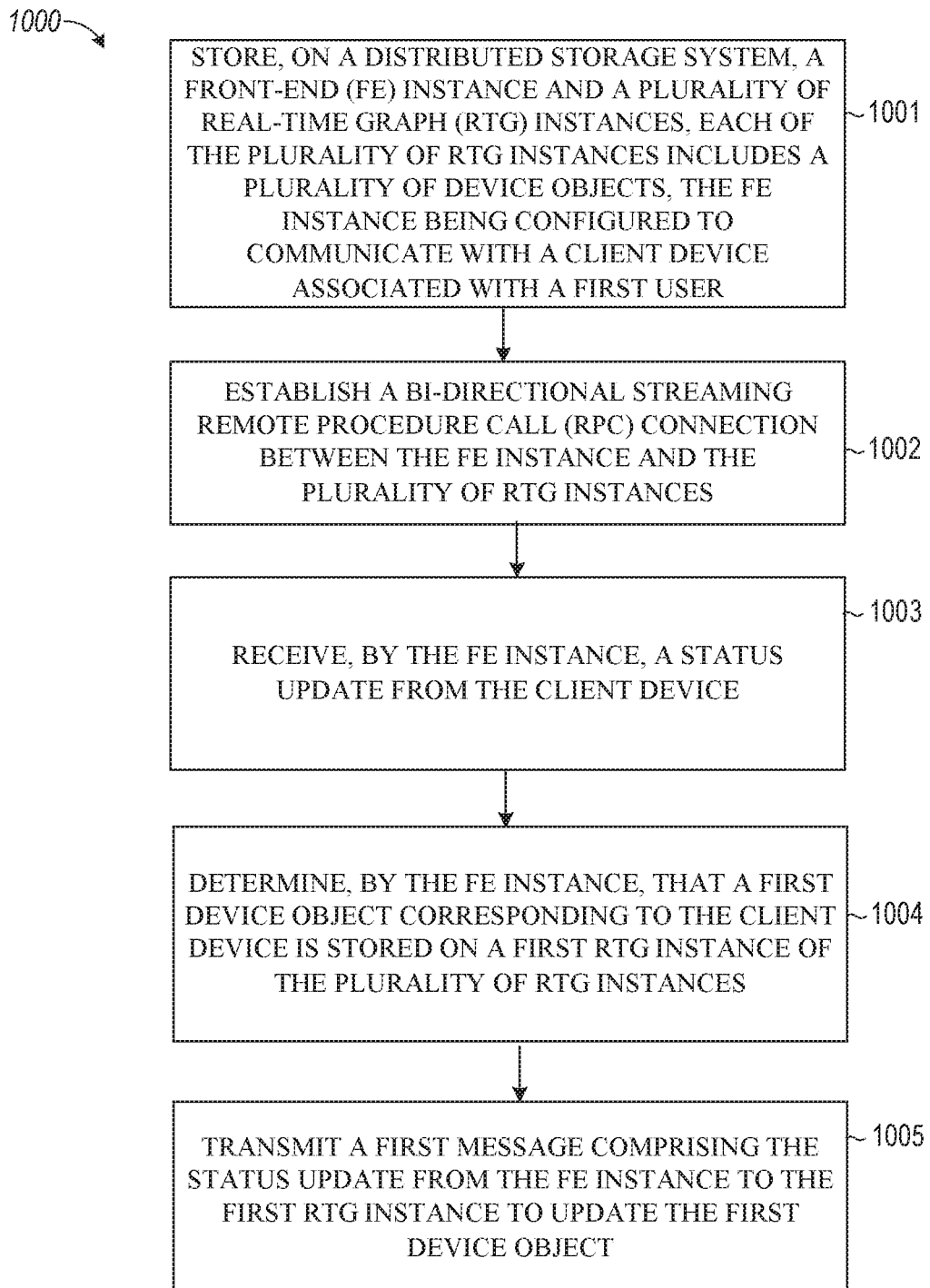
FIGS. 10A-D are flowcharts illustrating example operations of the distributed real-time status update server(s), according to examples.

FIG. 10A is a flowchart illustrating example operations of the distributed real-time status update server(s) 107 in performing process 1000, according to examples. The process 1000 may be embodied in computer-readable instructions for execution by one or more processors such that the operations of the process 1000 may be performed in part or in whole by the functional components of the distributed real-time status update server(s) 107; accordingly, the process 1000 is described below by way of example with reference thereto. However, in other examples at least some of the operations of the process 1000 may be deployed on various other hardware configurations, such as on application servers 112. The operations in the process 1000 can be performed in any order, in parallel, or may be entirely skipped and omitted At operation 1001, the distributed real-time status update server(s) 107 stores a front-end (FE) instance and a plurality of real-time graph (RTG) instances, each of the plurality of RTG instances includes a plurality of device objects, the FE instance being configured to communicate with a client device associated with a first user. For example, the distributed real-time status update server(s) 107 stores one or more FE instances 510 and one or more RTG instances 520. The FE instance 510 includes a proxy object configured to communicate with a client device 102 and the RTG instance includes one or more device objects (e.g., online or offline device objects).

At operation 1002, the distributed real-time status update server(s) 107 establishes a bi-directional streaming remote procedure call (RPC) connection between the FE instance and the plurality of RTG instances. For example, the FE instance 510 establishes the RPC connection with the one or more RTG instances 520.

At operation 1003, the distributed real-time status update server(s) 107 receives, by the FE instance, a status update from the client device. For example, the proxy object 512 of the FE instance 510 receives a location update from a client device 102 over a real-time streaming connection with the client device 102.

At operation 1004, the distributed real-time status update server(s) 107 determines, by the FE instance, that a first device object corresponding to the client device is stored on a first RTG instance of the plurality of RTG instances. For example, the FE instance 510 identifies the device object 522 and which of the RTG instances 520 stores the identified device object 522, such as by accessing the routing information 514.

At operation 1005, the distributed real-time status update server(s) 107 transmits a first message comprising the status update from the FE instance to the first RTG instance to update the first device object. For example, the FE instance 510 transmits the location update received from the client device 102 over the gRPC connection to the device object 522 in the identified RTG instance 520.

Figure 10B:
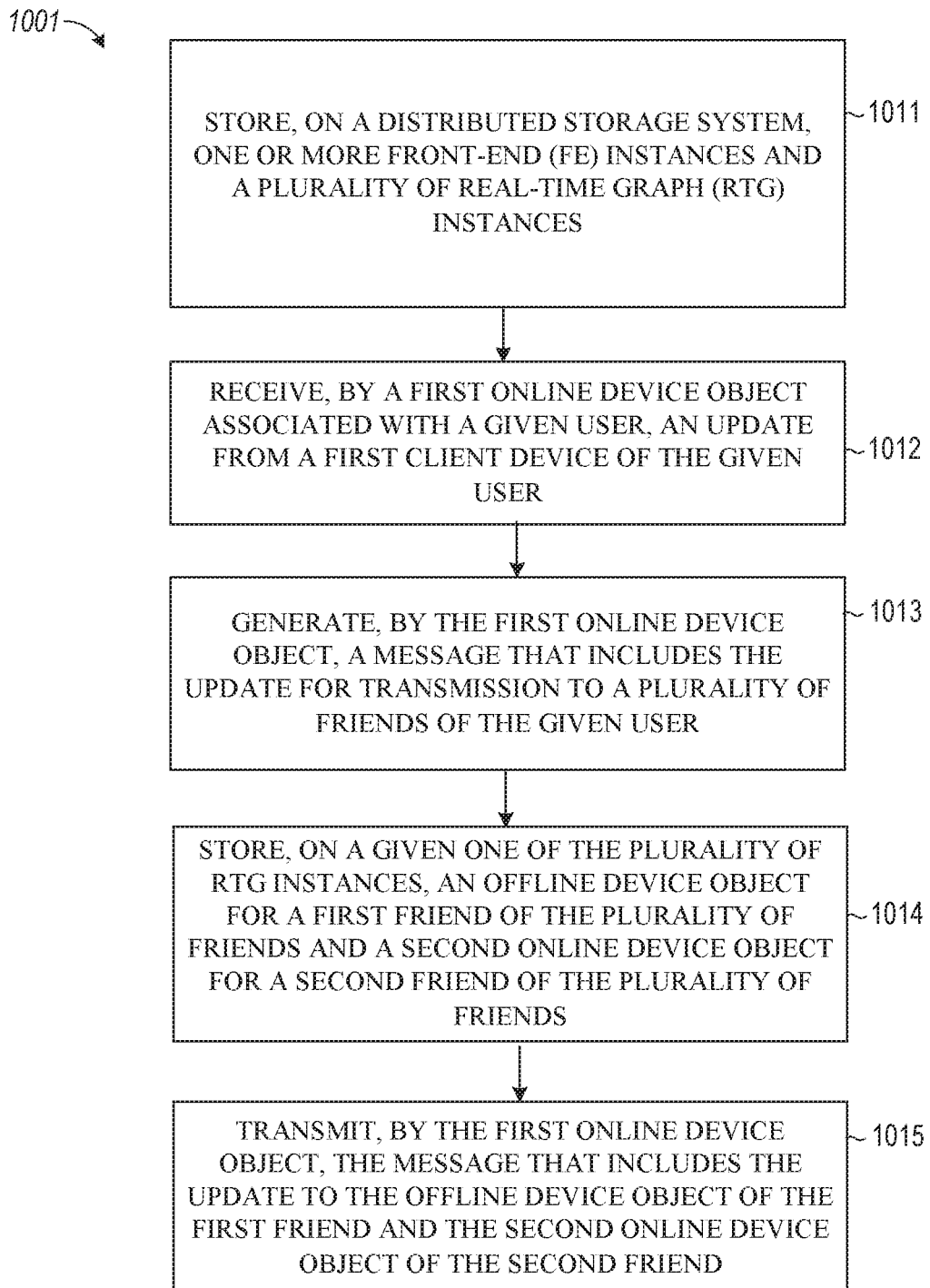

FIG. 10B is a flowchart illustrating example operations of the distributed real-time status update server(s) 107 in performing process 1001, according to examples. The process 1001 may be embodied in computer-readable instructions for execution by one or more processors such that the operations of the process 1001 may be performed in part or in whole by the functional components of the distributed real-time status update server(s) 107, accordingly, the process 1001 is described below by way of example with reference thereto. However, in other examples at least some of the operations of the process 1001 may be deployed on various other hardware configurations, such as on application servers 112. The operations in the process 1001 can be performed in any order, in parallel, or may be entirely skipped and omitted At operation 1011, the distributed real-time status update server(s) 107 stores one or more front-end (FE) instances and a plurality of real-time graph (RTG) instances. For example, the distributed real-time status update server(s) 107 stores one or more FE instances 510 and one or more RTG instances 520. The FE instance 510 includes a proxy object configured to communicate with a client device 102 and the RTG instance includes one or more device objects (e.g., online or offline device objects).

At operation 1012, the distributed real-time status update server(s) 107 receives, by a first online device object associated with a given user, an update from a first client device of the given user. For example, as shown in step 1 of FIG. 8C, the online device object A receives a location update from an FE instance 510 coupled to a first client device of a given user.

At operation 1013, the distributed real-time status update server(s) 107 generates, by the first online device object, a message that includes the update for transmission to a plurality of friends of the given user. For example, as shown in steps 1 and 2 of FIG. 8C, the online device object A sends OU messages to device objects of friends of the given user, such as device objects B, C, D and E.

At operation 1014, the distributed real-time status update server(s) 107 stores, on a given one of the plurality of RTG instances, an offline device object for a first friend of the plurality of friends and a second online device object for a second friend of the plurality of friends. For example, as shown in step 3 of FIG. 8C, the distributed real-time status update server(s) 107 stores an offline device object B (shown in a dashed circle) and an online device object C (shown in a solid circle).

At operation 1015, the distributed real-time status update server(s) 107 transmits, by the first online device object, the message that includes the update to the offline device object of the first friend and the second online device object of the second friend. For example, as shown in steps 1-3 of FIG. 8C, the online device object A sends OU messages to the offline device object B (shown in a dashed circle) and the online device object C (shown in a solid circle).

Figure 10C:
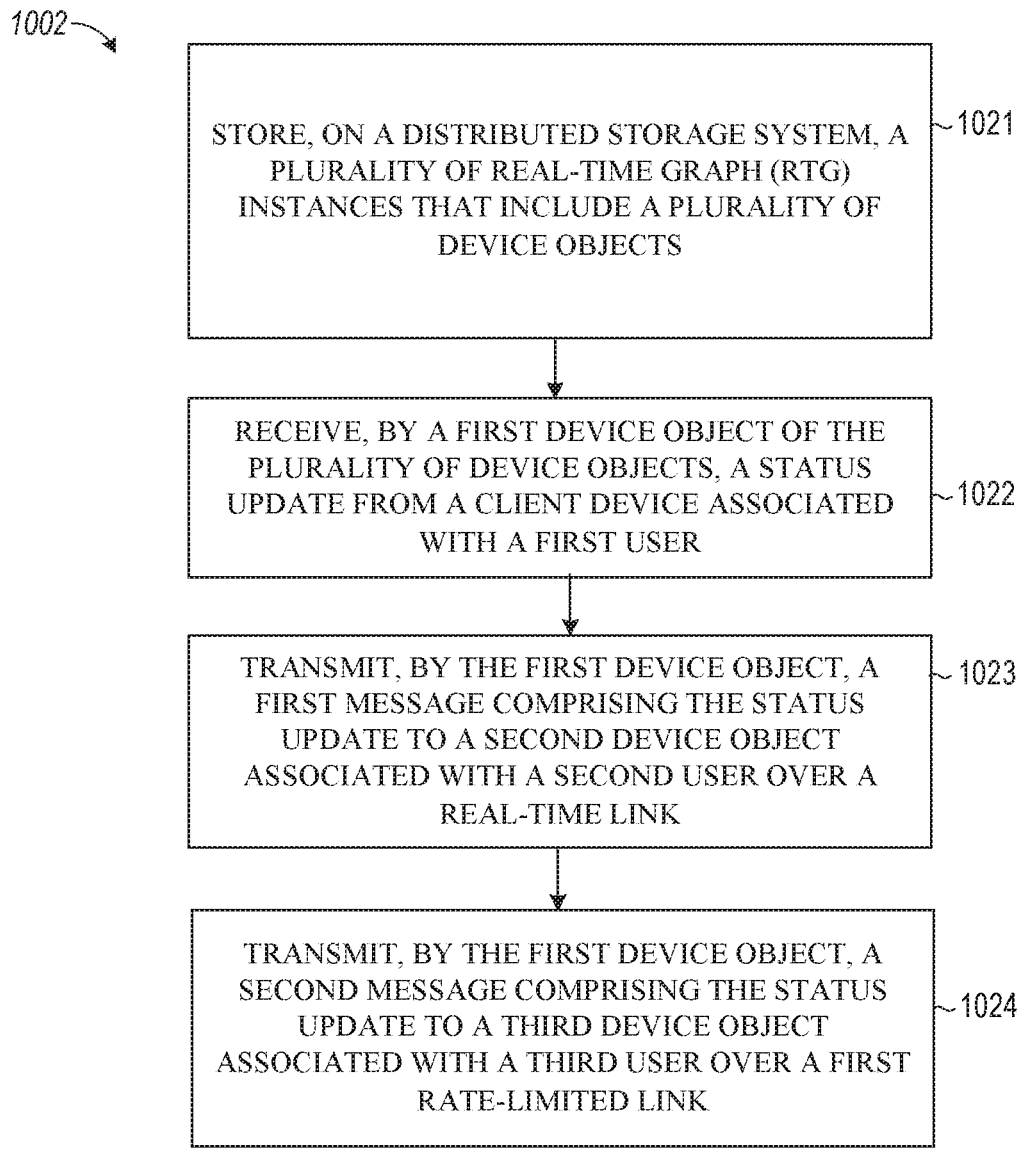

FIG. 10C is a flowchart illustrating example operations of the distributed real-time status update server(s) 107 in performing process 1002, according to examples. The process 1002 may be embodied in computer-readable instructions for execution by one or more processors such that the operations of the process 1002 may be performed in part or in whole by the functional components of the distributed real-time status update server(s) 107, accordingly, the process 1002 is described below by way of example with reference thereto. However, in other examples at least some of the operations of the process 1002 may be deployed on various other hardware configurations, such as on application servers 112. The operations in the process 1002 can be performed in any order, in parallel, or may be entirely skipped and omitted At operation 1021, the distributed real-time status update server(s) 107 stores a plurality of real-time graph (RTG) instances that include a plurality of device objects. For example, the distributed real-time status update server(s) 107 stores one or more FE instances 510 and one or more RTG instances 520. The FE instance 510 includes a proxy object configured to communicate with a client device 102 and the RTG instance includes one or more device objects (e.g., online or offline device objects).

At operation 1022, the distributed real-time status update server(s) 107 receives, by a first device object of the plurality of device objects, a status update from a client device associated with a first user. For example, the proxy object 512 of the FE instance 510 receives a location update from a client device 102 associated with the first user 810 over a real-time streaming connection with the client device 102. The proxy object 512 provides the location update to the first device object 830 associated with the first user 810.

At operation 1023, the distributed real-time status update server(s) 107 transmits, by the first device object, a first message comprising the status update to a second device object associated with a second user over a real-time link. For example, the first device object 830 transmits the location update over a real-time link 840 to the second device object 832 associated with the second user 820.

At operation 1024, the distributed real-time status update server(s) 107 transmits, by the first device object, a second message comprising the status update to a third device object associated with a third user over a first rate-limited link. For example, the first device object 830 transmits the location update over a rate-limited link 841 to the third device object 834 associated with a third user.

Figure 10D:
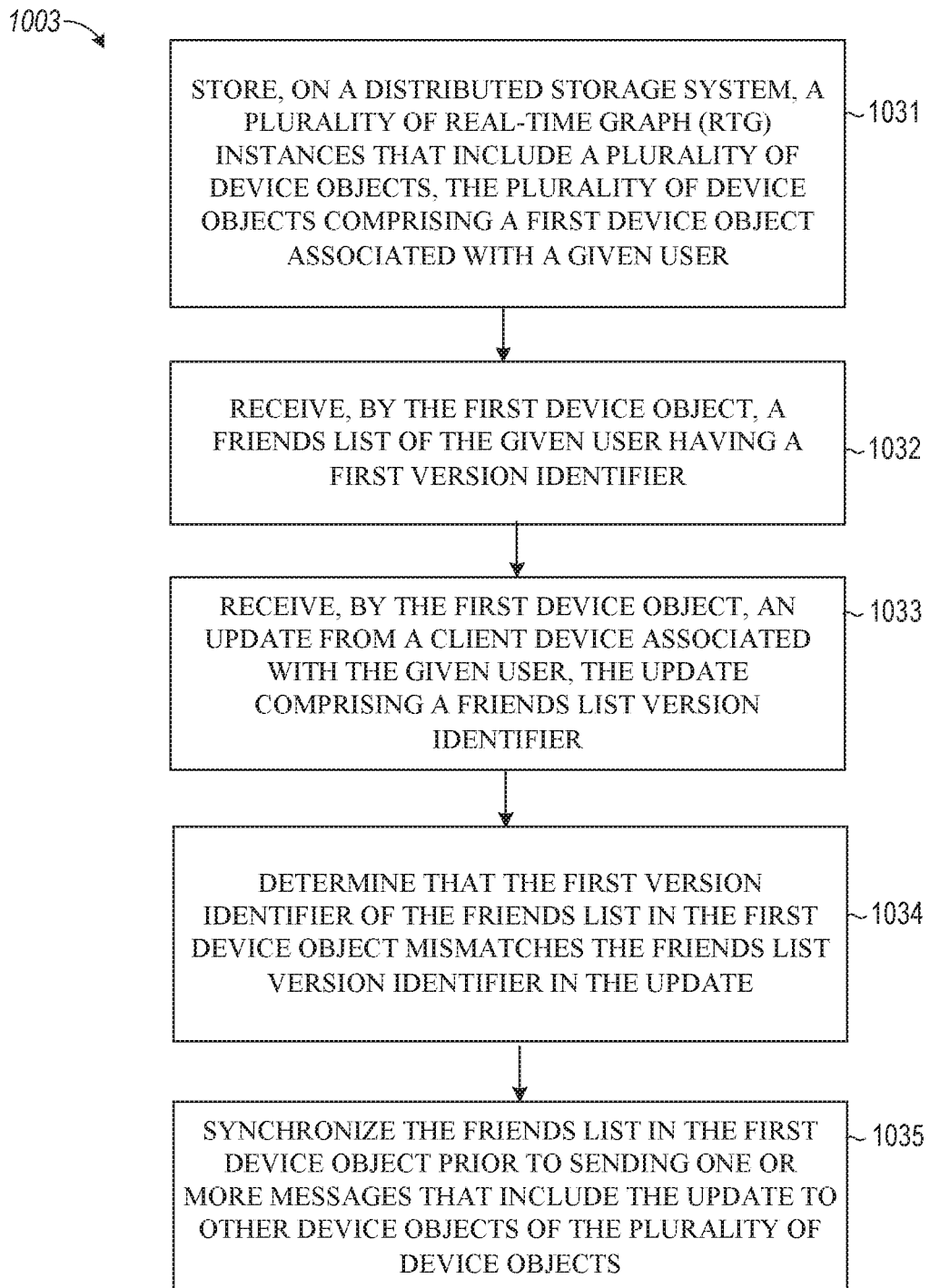

FIG. 10D is a flowchart illustrating example operations of the distributed real-time status update server(s) 107 in performing process 1003, according to examples. The process 1003 may be embodied in computer-readable instructions for execution by one or more processors such that the operations of the process 1003 may be performed in part or in whole by the functional components of the distributed real-time status update server(s) 107, accordingly, the process 1003 is described below by way of example with reference thereto. However, in other examples at least some of the operations of the process 1003 may be deployed on various other hardware configurations, such as on application servers 112. The operations in the process 1003 can be performed in any order, in parallel, or may be entirely skipped and omitted At operation 1031, the distributed real-time status update server(s) 107 stores a plurality of real-time graph (RTG) instances that include a plurality of device objects, the plurality of device objects comprising a first device object associated with a given user. For example, the distributed real-time status update server(s) 107 stores one or more FE instances 510 and one or more RTG instances 520. The FE instance 510 includes a proxy object configured to communicate with a client device 102 and the RTG instance includes one or more device objects (e.g., online or offline device objects).

At operation 1032, the distributed real-time status update server(s) 107 receives, by the first device object, a friends list of the given user having a first version identifier. For example, the device object 930 receives a friends list of a user A from a messaging server 114. The friends list has a version number 1000.

At operation 1033, the distributed real-time status update server(s) 107 receives, by the first device object, an update from a client device associated with the given user, the update comprising a friends list version identifier. For example, the device object 930 receives a location update from a client device 102 associated with the user A. The location update includes a version identifier of the friends list locally accessed or stored by the client device 102. The version identifier may have a version number of 1001. As an example, the client device 102 may have un-friended a given friend or changed a parameter to prevent location sharing with a given friend on the friends list. In response, the client device 102 may update the friends list on the messaging server 114 and increment the version identifier of the friends list.

At operation 1034, the distributed real-time status update server(s) 107 determines that the first version identifier of the friends list in the first device object mismatches the friends list version identifier in the update. For example, the device object 930 compares the version identifier stored by the device object 930 with the version identifier received in the update to ensure that the device object 930 operates on the most recent version of the friends list. The device object 930 performs this comparison before sending further updates to any device objects of the friends of the given user.

At operation 1035, the distributed real-time status update server(s) 107 synchronizes the friends list in the first device object prior to sending one or more messages that include the update to other device objects of the plurality of device objects. For example, in response to the device object 930 determining that the current version identifier (e.g., 1000) does not match the version identifier (e.g., 1001) received in the update, the device object 930 accesses the friends list from the messaging server 114 or client device 102 prior to sending further updates to the device objects associated with the friends of the given user.

Machine Architecture

Figure 11:
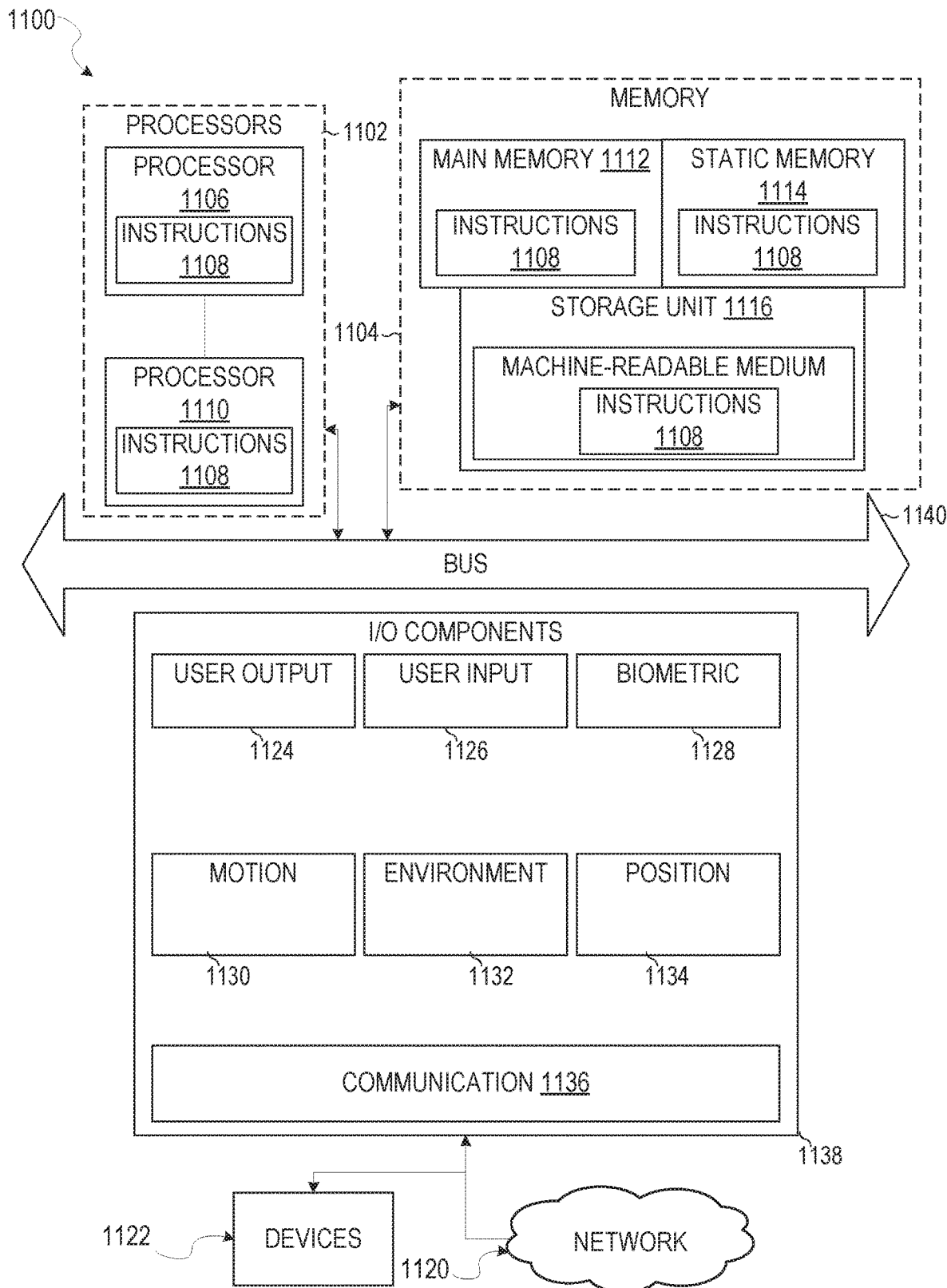
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output (I/O) components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, all accessible to the processors 1102 via the bus 1140. The main memory 1104, the static memory 1114, and the storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 3600 camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 1108 may be transmitted or received using a transmission medium via a coupling (e.g., a peer-to-peer coupling) to the devices 1122.

Software Architecture

Figure 12:
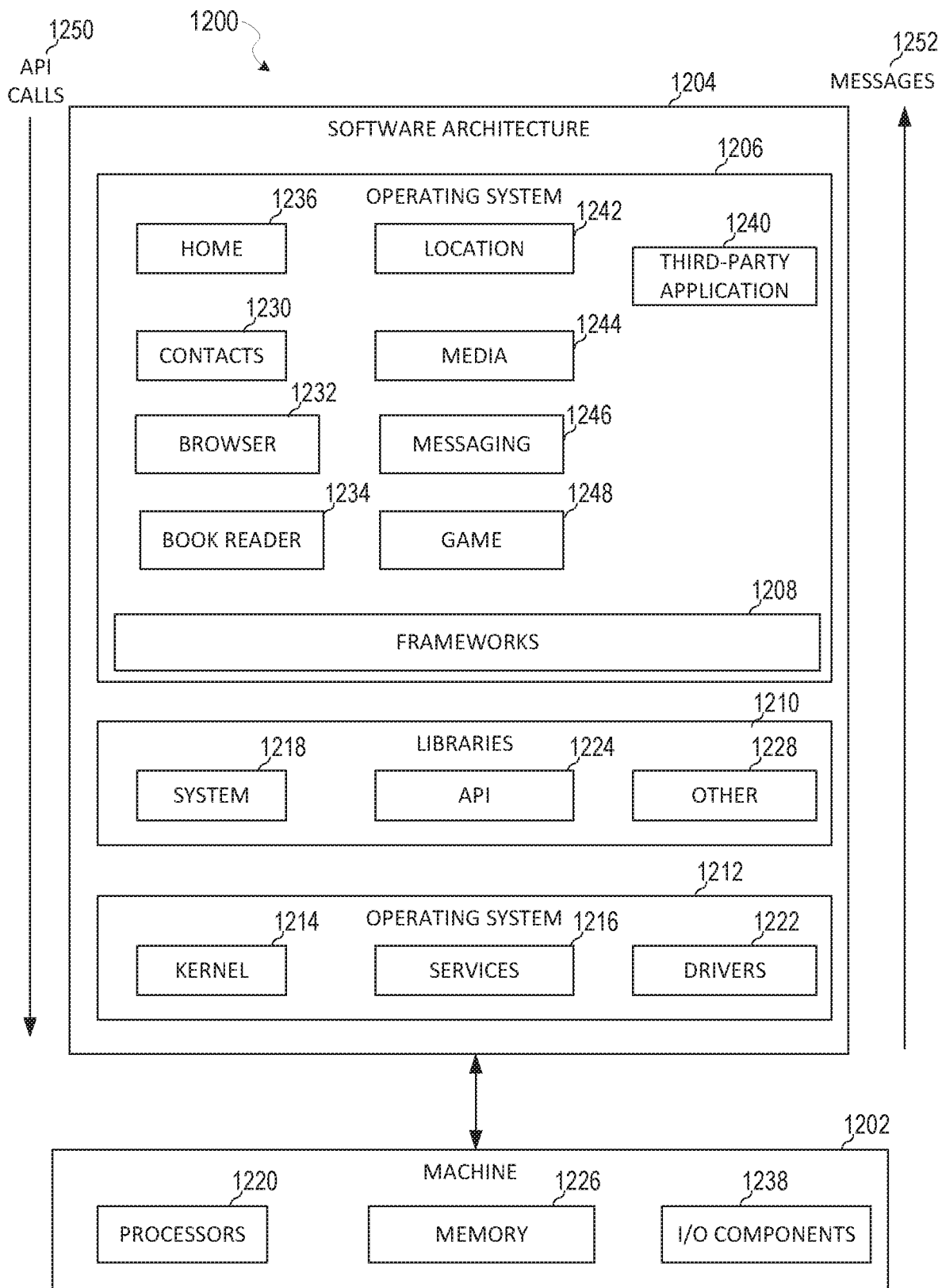
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1102 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium"

mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
storing, on a distributed storage system, a plurality of real-time graph (RTG) instances that include a plurality of device objects, the plurality of device objects comprising a first device object associated with a given user;
receiving, by the first device object, a friends list of the given user having a first version identifier, a first friend on the friends list being associated with a second device object of the plurality of device objects and a second friend on the friends list being associated with a third device object of the plurality of device objects;
transmitting location update messages from the first device object associated with the given user to the second and third device objects associated with the first and second friends of the friends list of the given user;
receiving, by the first device object, an update from a client device associated with the given user, the update comprising a friends list version identifier;
determining that the first version identifier of the friends list in the first device object mismatches the friends list version identifier in the update;
in response to determining that the first version identifier of the friends list in the first device object mismatches the friends list version identifier in the update, temporarily preventing further location update messages from being transmitted to the second and third device objects associated with the first and second friends of the friends list of the given user;
synchronizing the friends list in the first device object to generated an updated friends list; and
after synchronizing the friends list in the first device object, resuming transmission of location update messages to device objects associated with friends on the updated friends list.

2. The method of claim 1, wherein the first version identifier comprises a version number.

3. The method of claim 1, further comprising comparing the first version identifier of the friends list in the first device object with the friends list version identifier in the update.

4. The method of claim 1, further comprising:
determining that the location update messages satisfy a condition associated with a first rate-limited link; and
while the location update messages are being transmitted immediately over a real-time link to the second device object, delaying transmitting, by the first device object, the location update messages to the third device object over the first rate-limited link in response to determining that the location update messages satisfy the condition.

5. The method of claim 4, wherein the condition comprises a location being changed relative to a previously stored location by more than a first threshold amount.

6. The method of claim 1, wherein the location update messages are transmitted to the second device object immediately while the location update messages are transmitted to the third object periodically.

7. The method of claim 1, further comprising:
transmitting the location update messages over a real-time link in response to determining that a current status of the first friend indicates that the first friend is currently viewing an interactive map of avatars including an avatar for the given user.

8. The method of claim 1, further comprising storing, on the distributed storage system, a front-end (FE) instance, the FE instance being configured to communicate with the first client device, the FE instance receiving the update from the client device and identifying the first device object corresponding to the client device stored on a first RTG instance of the plurality of RTG instances, the FE instance transmitting a first message comprising the update to the first RTG instance, the first RTG instance updating the first device object based on the update in the first message received from the FE instance.

9. The method of claim 8, further comprising:
establishing a bi-directional streaming remote procedure call (RPC) connection between the FE instance and the plurality of RTG instances; and
establishing a real-time link between the FE instance and the client device to receive the update from the client device.

10. The method of claim 9, further comprising:
obtaining routing information from an RTG configuration map;
storing the routing information in the FE instance, wherein the FE instance comprises a proxy object and tag routing information, a first portion of routing information indicates that the first RTG instance comprises a first subset of the plurality of device objects and that a second RTG instance of the plurality of RTG instances comprises a second subset of the plurality of device objects, wherein the FE instance identifies the first device object stored on the first RTG instance by searching the routing information for an identifier of the client device that is associated with the first device object.

11. The method of claim 10, further comprising:
determining, by the FE instance, that the identifier of the client device is missing from the routing information; and
in response to determining, by the FE instance, that the identifier of the client device is missing from the routing information, instructing, by the FE instance, one of the plurality of RTG instances to generate a new device object for the client device.

12. The method of claim 10, wherein the routing information is obtained by the FE instance periodically.

13. The method of claim 8, wherein the first device object generates a plurality of messages directed to the second and third device objects of the first and second friends.

14. The method of claim 13, further comprising:
determining, by the first device object, that the second device object is stored on a second RTG instance of the plurality of RTG instances and that the third device object is stored on the first RTG instance that stores the first device object;
in response to determining that the second device object is stored on the second RTG instance and that first RTG instance stores the first device object, transmitting, by the first device object, the update to a randomly selected FE instance, the randomly selected FE instance forwards the update to the second RTG instance for updating the second device object.

15. The method of claim 8, wherein the FE instance is delete based on a load of a server that hosts the distributed storage system.

16. The method of claim 1, further comprising grouping a plurality of front-end (FE) instances and the plurality of RTG instances into a plurality of groups associated with different geographical regions, wherein messages exchanged between FE instances and RTG instances in a first group of the plurality of groups are exchanged in real-time, and wherein messages exchanged between FE instances and RTG instances in a second group of the plurality of groups are grouped and exchanged in bulk periodically.

17. A system comprising:
a processor configured to perform operations comprising:
storing, on a distributed storage system, a plurality of real-time graph (RTG) instances that include a plurality of device objects, the plurality of device objects comprising a first device object associated with a given user;
receiving, by the first device object, a friends list of the given user having a first version identifier, a first friend on the friends list being associated with a second device object of the plurality of device objects and a second friend on the friends list being associated with a third device object of the plurality of device objects;
transmitting location update messages from the first device object associated with the given user to the second and third device objects associated with the first and second friends of the friends list of the given user;
receiving, by the first device object, an update from a client device associated with the given user, the update comprising a friends list version identifier;
determining that the first version identifier of the friends list in the first device object mismatches the friends list version identifier in the update;
in response to determining that the first version identifier of the friends list in the first device object mismatches the friends list version identifier in the update, temporarily preventing further location update messages from being transmitted to the second and third device objects associated with the first and second friends of the friends list of the given user;
synchronizing the friends list in the first device object to generated an updated friends list; and
after synchronizing the friends list in the first device object, resuming transmission of location update messages to device objects associated with friends on the updated friends list.

18. The system of claim 17, further comprising operations for storing, on the distributed storage system, a front-end (FE) instance, the FE instance being configured to communicate with the first client device.

19. The system of claim 18, further comprising operations for establishing a bi-directional streaming remote procedure call (RPC) connection between the FE instance and the plurality of RTG instances.

20. A non-transitory machine-readable storage medium that includes instructions that, when executed by one or more processors of a machine, cause the machine to perform operations comprising:
storing, on a distributed storage system, a plurality of real-time graph (RTG) instances that include a plurality of device objects, the plurality of device objects comprising a first device object associated with a given user;
receiving, by the first device object, a friends list of the given user having a first version identifier, a first friend on the friends list being associated with a second device object of the plurality of device objects and a second friend on the friends list being associated with a third device object of the plurality of device objects;
transmitting location update messages from the first device object associated with the given user to the second and third device objects associated with the first and second friends of the friends list of the given user;
receiving, by the first device object, an update from a client device associated with the given user, the update comprising a friends list version identifier;
determining that the first version identifier of the friends list in the first device object mismatches the friends list version identifier in the update;
in response to determining that the first version identifier of the friends list in the first device object mismatches the friends list version identifier in the update, temporarily preventing further location update messages from being transmitted to the second and third device objects associated with the first and second friends of the friends list of the given user;
synchronizing the friends list in the first device object to generated an updated friends list; and
after synchronizing the friends list in the first device object, resuming transmission of location update messages to device objects associated with friends on the updated friends list.

* * * * *